United States Patent [19]

Ratner et al.

[11] Patent Number: 5,153,072
[45] Date of Patent: * Oct. 6, 1992

[54] METHOD OF CONTROLLING THE CHEMICAL STRUCTURE OF POLYMERIC FILMS BY PLASMA DEPOSITION AND FILMS PRODUCED THEREBY

[75] Inventors: Buddy D. Ratner; Gabriel P. Lopez, both of Seattle, Wash.

[73] Assignee: The Board of Regents of the University of Washington, Seattle, Wash.

[ * ] Notice: The portion of the term of this patent subsequent to Mar. 26, 2008 has been disclaimed.

[21] Appl. No.: 675,531

[22] Filed: Mar. 25, 1991

Related U.S. Application Data

[62] Division of Ser. No. 402,181, Aug. 31, 1989, Pat. No. 5,002,794.

[51] Int. Cl.[5] .................. B32B 27/08; B32B 15/08; B05D 3/06
[52] U.S. Cl. .................. 428/461; 428/517; 428/458; 428/520; 427/488
[58] Field of Search .................. 427/41, 40, 39, 38; 428/458, 430, 517, 461, 520

[56] References Cited

U.S. PATENT DOCUMENTS

| | | | |
|---|---|---|---|
| 3,475,307 | 10/1969 | Knox et al. | 117/93.1 |
| 4,132,829 | 1/1979 | Hudis | 428/411 |
| 4,212,719 | 7/1980 | Osada et al. | 204/165 |
| 4,419,382 | 12/1983 | Sliemers | 427/40 |
| 4,424,311 | 1/1984 | Nagaoka et al. | 259/4 |
| 4,656,083 | 4/1987 | Hoffman et al. | 428/265 |
| 4,705,612 | 11/1987 | Shimomura et al. | 204/165 |
| 5,002,794 | 3/1991 | Ratner et al. | 427/41 |

FOREIGN PATENT DOCUMENTS

57-164064 10/1982 Japan .

OTHER PUBLICATIONS

Yasuda et al., "Plasma Polymerization Investigated by the Substrate Temperature Dependence," *Journal of Polymer Science: Polymer Chemistry Edition*, 23:87–106 (1985).

Sherman, A., "Plasma-Assisted Chemical Vapor Deposition Processes and Their Semiconductor Applications," *Thin Solid Films*, 113:135–149 (1984).

Munro et al., "The Influence of Power and Substrate Temperature on Chemical Composition, Determined by ESCA, of the Inductively Coupled RF Plasma Polymerization of Acrylonitrile," *Journal of Polymer Science: Polymer Chemistry Edition*, vol. 23, 479–488 (1985).

Czornyj, G., "The Effect of Temperature on the Morphology of Plasma Polymerized Fluorocarbon Films," *ACS Org. Coatings Appl. Polym. Proc.*, 47:457–461 (1982).

Witt et al., "Convenient Direct Synthesis of $(SN)_x$ Films From $S_4N_4$ at Lower Temperatures," *American Chemical Society*, pp. 1668–1669 (1983).

(List continued on next page.)

Primary Examiner—Shrive Beck
Assistant Examiner—Roy V. King
Attorney, Agent, or Firm—Christensen, O'Connor, Johnson & Kindness

[57] ABSTRACT

A method of controlling the chemical structure of polymeric thin films formed by plasma deposition and films produced by these methods, is disclosed. An important aspect of the method involves controlling the temperature of the substrate and the reactor so as to create a temperature differential between the substrate and reactor such that the precursor molecules are preferentially adsorbed or condensed onto the substrate either during plasma deposition or between plasma deposition steps. The polymeric thin films produced by the methods of this invention exhibit more defined and predictable chemical structures and properties than conventional plasma deposited films.

4 Claims, 22 Drawing Sheets

OTHER PUBLICATIONS

Merrill et al., "Polyether Networks: Fibrinogen Adsorption and Platelet Retention," *The 11th Annual Meeting of the Society for Biomaterials*, 106 (1985).

Nagoaka et al., "Interaction Between Blood Components and Hydrogels With Poly(oxyethylene) Chains", *Polymers as Biomaterials*, 8352:361–375 (1984).

Merrill et al., "Polyethylene Oxide as a Biomaterial," *American Society for Artificial Internal Organs*, 2:60–64 (1983).

Ho Lee et al., "Protein-Resistant Surfaces Prepared by PEO-Containing Block Copolymer Surfactants," *Journal of Biomedical Materials Research*, 23:351–368 (1989).

Nojiri et al., "In vivo Protein Adsorption Onto Polymers: A Transmission Electron Microscopic Study," *Trans. Am. Soc. Artif. Intern. Organs*, XXV:357–361 (1989).

Maechling-Strasser et al., "Synthesis and Adsorption of a Poly(N-Acetylethyleneimine)-Polyethyleneoxide-Poly(N-Acetylethyleneimine) Triblock--Copolymer at a Silica/Solution Interface. Influence of Its Preadsorption on Platelet Adhesion and Fibrinogen Adsorption," *Journal of Biomedical Materials Research*, 23:1395–1410 (1989).

Andrade et al., "Surfaces and Blood Compatibility Current Hypotheses," *Trans. Am. Soc. Arif. Intern. Organs*, XXXIII:75–84 (1987).

Marmur et al., "Sedimentation and Adhesion of Blood Platelets Under a Centrifugal Force," *Journal of Colloid and Interface Science*, 104:390–397 (1985).

Nishimura et al., "Adhesion Behavior of Rat Lymphocytes on Poly(g-Benzyl L-Glutamate) Derivatives Having Hydroxyl Groups or Poly(Ethylene Glycol) Chains", *Makromol. Chem.*, 185:2109–2116 (1984).

Akizawa et al., "Efficiency and Biocompatability of a Polyethylene Glycol Grafted Cellulosic membrane During Hemodialysis," *Trans. Am. Soc. Artif. Intern. Organs*, XXXV:333–335 (1989).

Bots et al., "Small Diameter Blood Vessel Prostheses From Blends of Polyethylene Oxide and Polypropylene Oxide," *Biomaterials*, 7(5):393–399 (1986).

Lee et al., "Surface Properties of Aqueous Peo-Containing Block Copolymer Surfactants: Protein-Resistant Surfaces," *ACS Poly. Mat. Sci. and Eng.*, 57:613–617 (1987).

Sun et al., "Non-Fouling Biomaterial Surfaces: II. Protein Adsorption on Radiation Grafted Polyethylene Glycol Methacrylate Copolymers," *ACS Polymer Reprints*, 23(1):292–294 (1987).

Courtney et al., "Measurement of Platelet Loss in the blood Compatibility Assessment of Biomaterials," *Biomaterials*, 8:231–232 (1987).

Tsai et al., "Enhanced Albumin Affinity of Silicone Rubber," *Trans. Am. Soc. Intern. Organs*, XXXIV:59–563 (1988).

Eberhart et al., "Albumin Adsorption and Retention on $C_{18}$-Alkyl-Derivatized Polyurethane Vascular Grafts," *Artificial Organs*, 11(5):375–382 (1987).

Pitt et al., Albumin "Adsorption on Alkyl Chain Derivatized Polyurethanes: I. The Effect of C–18 Alkylation," *Journal of Biomedical Materials Research*, 22:359–382 (1988).

Pitt et al., "Albumin Adsorption on Alkyl Chain Derivatized Polyurethanes," *Journal of Biomedical Materials Research*, 9:36–346 (1988).

Munro et al., "Thromboresistant Alkyl Derivatized Polyurethanes," *American Society for Artificial Internal Organs*, 6:65–75 (1983).

Yasuda, H., "Glow Discharge Polymerization," *Journal of Polymer Science: Macromolecular Reviews*, 16:199–293 (1981).

Lee, J. H. et al., "Surface Properties of Aqueous Peo--Containing Block Copolymer Surfactant: Protein Resistant Surfaces," *Department of Materials Science and Engineering*, University of Utah, USA (1987).

Sun, Y. et al., "Non-fouling Biomaterials Surfaces: II. Protein Adsorption on Radiation Grafted Polyethylene Glycol Methacrylate Copolymers," *ACS Polymer Reprints*, 28(1):292–294 (1987).

Gombotz, W. R. et al., "Immobilization of Poly(ethyelene Oxide) on Poly(ethylene Terephthalate) Using a Plasma Polymerization Process," *Journal of Applied Polymer Science*, 37:91–107 (1989).

Yasuda, H. et al., "Plasma Polymerization of Some Organic Compounds and Properties of the Polymers," *Journal of Polymer Science: Polymer Chemistry Section*, 14:195–224 (1976).

Lopez, G. P. et al., "Effect of Reduced Substrate Temperature on Film Chemistry in Plasma Deposition of Organics," Abstract Submission Form for ISPC-9 Italy (Pugnochiuso) 1989.

Lopez, G. P. et al., "Preparation of Non-Fouling Biomaterial Surfaces by Plasma Deposition of Poly(Ethylene Glycol) Oligomers and Precursors," Nov., 1989.

Lopez, G. P. et al., "Effect of Reduced Substrate Temperature on Film Chemistry in Plasma Deposition of Organics," Sep. 1989.

Lopez, G. P. et al., "Method of Preparation of Non--Fouling Biomaterial Surfaces by Plasma Deposition of Poly(ethyelen Glycol) Oligomers and Precursors," Extended Abstract, American Institute of Chemical Engineers, Nov., 1989.

Ratner, B. D. et al., "Surface Characterization of Hydrogels Prepared by Three Methods," Extended Abstract, American Institute of Chemical Engineers, Dec., 1988.

METHOD OF CONTROLLING THE CHEMICAL STRUCTURE OF POLYMERIC FILMS BY PLASMA DEPOSITION AND FILMS PRODUCED THEREBY

This invention was made with government support under grant number 5 R01 HL 19419 awarded by the National Institutes of Health. The government has certain rights in this invention.

This is a divisional of prior application Ser. No. 07/402,181, filed Aug. 31, 1989, now U.S. Pat. No. 5,002,794.

TECHNICAL FIELD

This invention relates to methods of controlling the chemical structure of thin films formed by plasma deposition, and to films produced by these methods.

BACKGROUND OF THE INVENTION

Plasma deposition of thin organic films has increased in importance in a number of areas of technology in recent years. Overlayer films on solid substrates can be produced without exposing the solids to solvents or high energy radiation. Films deposited by this method show many desirable characteristics including ease of preparation, uniformity, conformal coverage of complex substrates, excellent adhesion to a variety of substrates and the ability to generate unique chemistries. In addition, the overlayer films do not penetrate significantly into the substrate and, therefore, do not affect the mechanical properties of the substrate. These films are typically free of leachable components and can be designed to prevent leachable components in the substrate from diffusing out.

The primary disadvantage of plasma deposited films is that they are of illdefined chemistry. Because of the complexity of the composition of the plasma phase and the many possible reaction mechanisms that may lead to the incorporation of a particular atom or functional group into the growing film, the final film obtained from these types of depositions is hard to predict or control. Participating reactions have been grouped into plasma phase and surface reactions, and generalized mechanistic schemes for these reactions have been developed. H. Yasuda, *J. Polym. Sci. Macromol. Rev.*, 16, 199-14 293 (1981). During a plasma deposition, an organic compound (precursor), which may or may not be polymerizable by traditional methods, is dissociated and rearranged to produce a new structure and finally deposited onto a substrate in a chemical environment that is typically quite different from the original. For example, if an organic amine is introduced into the plasma environment with the intent of introducing amine fuctionalities on the film surface, a wide range of nitrogen containing organic functional groups will actually be obtained. Consequently, chemical tailoring of films by this method has often been quite laborious and typically phenomenological in approach.

Bell and coworkers were among the first groups to study the effects of deposition variables on film chemistry. K. Nakajima, A. T. Bell, and M. Shen, *J. Apl. Polym. Sci.*, 23,2627-2637 (1979). They produced films under conditions where the dominant functional group is —$CF_2$—. They noted that these conditions also favored low deposition rates, and that at conditions which produce higher deposition rates, the number of —$CF_2$— groups decreases and a more crosslinked polymer is formed. However, they did not disclose or suggest that a temperature differential between substrate and deposition chamber could be employed to control chemistry of the deposited film.

The dependence of film chemistry on operational variables has thus far been mainly expressed in terms of the degree of precursor fragmentation that occurs between the time of exposure to the plasma and the incorporation into the film matrix. Thus, if a functional group of interest is to be incorporated into a film without fragmentation or rearrangement, the operational parameters of the deposition must be identified which affect fragmentation and these must be tailored to prevent extensive fragmentation.

Clark and coworkers also studied the effects of deposition variables on film chemistry. D. T. Clark, *Pure & Appl. Chem.*, 54, 415-438 (1982);D. T. Clark and M. Z. Abrahman, *J. Polym. Sci., Polym. Chem. Ed.*, 20, 691-706 (1982); and D. T. Clark and M. Z. Abrahman, *J. Polym. Sci., Polym. Chem. Ed.*, 20 1729-1744 (1982). Using X-ray photoelectron spectroscopy (XPS) analysis of various types of fluorocarbon deposits, they were able to show that the films deposited at low power levels incorporated precursor with a low degree of functional group (e.g., aromatic) fragmentation than at high power levels. They also showed that higher system pressure during the deposition favors less fragmentation. By comparison with the deposition rate data, they surmised that the W/FM parameter, which determines deposition rate characteristics, may be an indicator of the degree of fragmentation the precursor undergoes during deposition. Here, W is the RF power supplied to the plasma, F is the precursor flow rate, and M is the precursor molecular weight.

The W/FM parameter, which was first introduced by Yasuda et al., is a measure of the energy supplied per unit mass of the precursor introduced to the plasma. H. Yasuda and T. Hirotsu, *J. Polym. Sci., Polym. Chem. Ed.*, 16, 743-759 (1978). It is therefore reasonable that the amount of precursor fragmentation which occurs before it is finally deposited into the film matrix is related to W/FM. The effect of W/FM on film chemistry was also investigated by Inagaki et al. N. Inagaki, M. Doyama, and H. Igaki, *J. Polym. Sci., Polym. Chem. Ed.*, 22, 2083-2093 (1984). They too, confirmed the concept that low W/FM conditions were conducive to precursor substituent effects. The effects of methyl, methoxy, and vinyl substituents were studied using XPS elemental analysis and infrared adsorption spectroscopy.

An alternative, but similar, formalism was provided by Evans and Prohaska. J. F. Evans and G. W. Prohaska, *Thin Solid Films*, 118, 171-180 (1984). They calculated a power to molecule ratio by the expression:

$$P/M = RTW/PVN_A$$

where T is the ambient temperature, P is the steady state pressure of the discharge, V is the reactor volume, and W is the net steady state power delivered to the reactor. For two different precursor systems, they found deposition rate was increased at higher P/M levels and that chemical functionalities of the precursors are retained and incorporated into the deposited films at low P/M conditions.

The effect of several other system variables has also been discussed as a means of varying the deposited film chemistry or as a way of obtaining films of more predictable chemistry by reducing the fragmentation of the precursor. One example of this is the use of pulsed radio frequency (RF) discharges to initiate plasma-induced polymerization during the powered portion of the pulse period which can continue during the unpowered portion. Such a scheme would tend to incorporate precursor in a relatively unfragmented state during the unpowered portion of the deposition. H. Yasuda and T. Hsu, *J. Polym. Sci., Polym. Chem. Ed.*, 15, 81–97 (1977). Chemical properties of films were found, by Yasuda and Hsu, to vary significantly when pulsed discharges were used. The degree of change produced by this manner was found to depend on the precursor structure. In particular, electron spin resonance (ESR) signals of free spins from the deposited films and the glass substrates were found to vary substantially for some precursors. Nakajima, et al., performed similar investigations using one of the precursors investigated by Yasuda and Hsu, namely tetrafluoroethylene. K. Nakajima, A. T. Bell, and M. Shen, *J. Appl. Polym. Sci.*, 23, 2627–2637 (1979). They found essentially no difference in deposition rate and XPS analysis resulting from the pulsed discharge mode.

Another method that has been investigated for incorporating precursor in a relatively unfragmented state is the placement of substrates in a position in the reactor which is adjacent to the plasma but not completely submersed in it. The rationale for doing this is that outside the bulk of the plasma the proportion of unfragmented precursor molecules will be greater and these can be incorporated into the film by propagation reactions, while initiation and termination reactions would be less frequent. Moreover, the degree of ion, electron, radical and photon bombardment will depend on the location of the substrate with respect to the plasma and the resulting film chemistry is expected to vary accordingly.

Two methods for achieving such an optimum substrate position have been investigated. A logical choice is to place the substrates downstream from the plasma. O'Kane and Rich found that the polymer films deposited downstream were more linear in structure (i.e., were less crosslinked) than those deposited within the plasma. D. F. O'Kane and D. W. Rice, *J. Macromol. Sci., Chem.*, A10, 567–577 (1976). Deposition rate also decreases downstream from the plasma, however. Pender, et al., used a slightly more complex arrangement to place substrates in the vicinity of the plasma. M. R. Pender, M. Shen, A. T. Bell, and M. Millard, in *ASC Symposium Series* 108: Plasm Polymerization, Vol. 108, M. Shen and A. T. Bell, Eds., American Chemical Society, Washington, D.C. 1979, pp. 147–160; M. Pender, M. Shen, A. T. Bell, and M. Millard, *Polym. Prepr., Am. Chem. Soc., Div. Polym. Chem.*, 19, 516–521 (1978). They constructed a Faraday cage in which the substrates to be coated could be placed. This reduced the bombardment by highly energetic electrons and presumably only the reactive species which diffused through the cage were able to come in contact with the substrate. The deposition of several fluorocarbon precursors was investigated using XPS. These precursors all contain a double bond and have a fluorine to carbon (F/C) ratio of 2.1. The samples deposited inside the cage showed a slight increase in $CF_3$ groups and a slight decrease in CF groups over films deposited without the cage. The authors attribute these changes to "more chain branching ending in terminal fluoromethyl groups, and less trifunctional crosslink sites or branch points." The F/C ratio was seen to increase slightly by an average of 0.2, but was still considerably less ($\sim 1.2$) than that of the precursors (2.0).

Kay and Dilks have implied that regulation of the electron energy and density characteristics of a plasma will be important in controlling film chemistry during depositions. E. Kay and A. Kilks, *J. Vac. Sci. Technol.*, A, 18, 1–11 (1981). This is evident because the various excitation, ionization and fragmentation processes in low temperature plasmas are known to be due primarily to electron collisions with gaseous precursors. There may be numerous ways to modify the electron energy and density distributions, several of which have been used in sputter deposition techniques (e.g., substrate biasing). The processes involved in organic deposition are considerably more complex than those in sputtering, however, and prediction of biasing effects may be difficult. Other ways of modifying electron energy and density distributions may include the use variable frequency discharges or optogalvanic mechanism.

The following patents disclose additional information related to plasma deposition processes:

U.S. Pat. No. 3,475,307 describes a method for increasing deposition rates in flow discharge reactors. The method involves condensing a monomer vapor on a substrate and then subjecting it to a glow discharge. Instead of attempting to control the chemistry of a film as in the present invention, this patent is primarily directed to adjusting the physical mass of the films.

According to the method disclosed herein, it will be possible to control deposition rates better than with the previous technology in part because the present technique is not limited to condensation with subsequent polymerization. By decreasing the temperature of the substrate to a point above the condensation temperature of the precursor, it is possible to increase the deposition rate without subjecting the substrate to bulk condensation which is difficult to control in terms of the total amount of the material that is deposited. This is due to the difficulty in limiting condensation to a specific period of time. More elaborate cooling systems than the simple liquid cooled systems described in U.S. Pat. 3,475,307 are required to precisely control the amount of condensate deposited onto a surface. The present application also distinguishes between the behavior of two types of precursors, polymerizable and nonpolymerizable, used in deposition, and present specific examples of film qualities obtained using nonpolymerizable precursors, some of which may actually show decreased deposition rates when deposited below the condensation temperature.

U.S. Pat. No. 3,068,510 is one of the first descriptions of the methods and apparatus used for glow discharge polymerization.

U.S. Pat. No. 4,212,719 describes the process where a nonvapor volume of monomer (liquid and/or solid) is exposed to an ionized gas plasma which initiates polymerization. This is essentially a bulk polymerization process, unlike that of the subjecting invention.

U.S. Pat. No. 4,705,612 describes a method for plasma-initiated polymerization of organic compounds. The method for plasma-initiated polymerization consists of exposing a vapor phase containing monomer vapor to a plasma and introducing a radical polymerization initiator during the exposure.

In spite of the teachings of the art, there remains an inability to adequately control the chemistry of thin films produced in a plasma deposition process.

SUMMARY OF THE INVENTION

The present inventors have discovered that a greater degree of control over the chemical structure of a plasma deposited film may be achieved by creating a differential between the temperature of a substrate on which a thin film is to be deposited and the temperature of a plasma deposition chamber which surrounds the substrate during the deposition process. The temperature of the substrate will be lower than that of the deposition chamber. While temperature control has been used for other purposes in connection with deposition processes in the past, it has not previously been recognized than an appropriate temperature differential can provide a means for reducing fragmentation and rearrangement of precursor molecules during plasma deposition.

The present solution to the problem of reducing fragmentation and rearrangement of precursor molecules during plasma deposition to produce a thin film of controlled chemistry on a substrate may be utilized in a variety of areas of technology that use films, including sensors, microelectronic devices, biomaterials, membranes for separation and purification, and protective coatings. Improved films of predictable and controlled chemical structure would be useful in each of these areas of technology, and others.

DETAILED DESCRIPTION OF THE PREFERRED EMBODIMENTS

Figure 1:
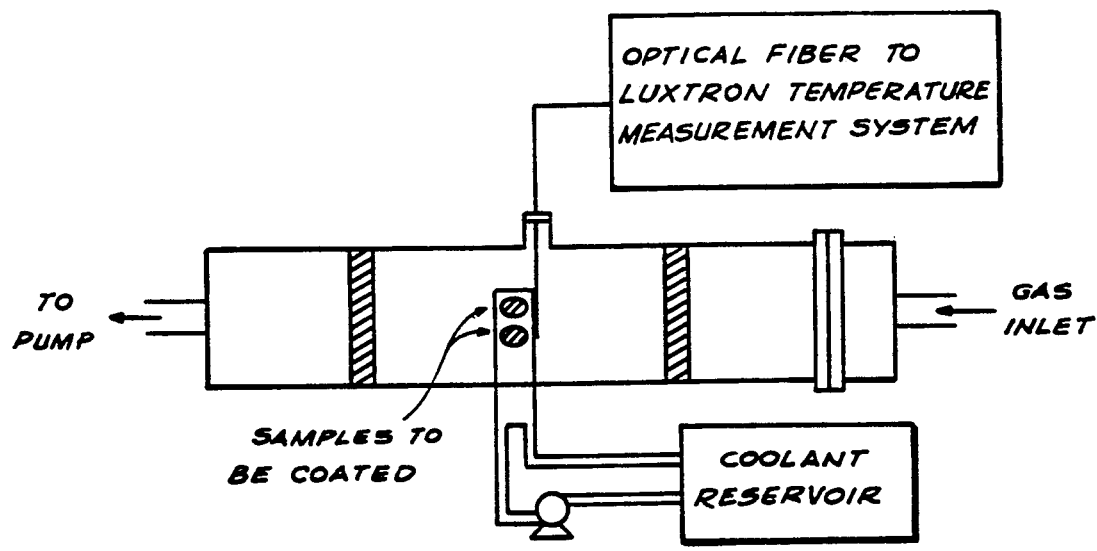
FIG. 1 depicts a prototype tubular reactor for deposition at reduced substrate temperatures.

The inventors investigated the effect of controlling temperature on the structure of films obtained by plasma deposition. This has led to the production of thin, organic coatings exhibiting both the good film qualities associated with plasma deposited films and high chemical specificity and control associated with traditional organic chemistry. Because the glow discharge plasma is weakly ionized, decreasing the substrate temperature can lead to preferential condensation (or adsorption) of low energy, unexcited gaseous species and, therefore, can increase the concentration of nonfragmented molecules in the film growth region. Chemical specificity of the film is, therefore, achieved by the incorporation of unfragmented precursors into the film matrix by the reactive species generated by the plasma. This method can result in the incorporation of relatively intact precursor molecules into the film matrix. Hence, higher probability of incorporation of desired chemical functionalities from the precursor molecule and a higher predictability of film chemistry are obtained.

The new process for the control of chemistry in plasma depositions is based on several improvements on the prior art. Specifically, these include using a low power plasma discharge and simultaneously (or consecutively) condensing nonfragmented precursor gas vapor by maintaining a temperature differential between the substrate to be coated ($T_s$) and the surrounding reactor apparatus ($T_r$), such that $\Delta T = T_s - T_r < 0$. This process can be used with a wide variety of organic functional-group-containing molecules, including those that are traditionally considered to be polymerizable and those considered to be nonpolymerizable.

The monomers that are deposited to form a thin film are referred to as precursors. The precursors of the present invention may vary widely and can generally be any organic functional group-containing molecule that has a sufficient vapor pressure under plasma deposition conditions to be adequately deposited. Examples of classes of precursors and specific embodiments of these classes are provided hereinbelow.

The substrate onto which the thin layer may be deposited is not necessarily limited other than that it must be compatible with the precursor to be deposited on it and the environment of the plasma deposition technique. Examples of particular substrates which may be used are stainless steel, glass, polyethylene, polytetrafluoroethylene (e.g., Teflon ®), brass, polyethylene terephthalate, and the like.

The process is conducted in a plasma deposition reactor, modified if necessary to provide for temperature control of the substrate and/or deposition chamber. Generally, since relatively thin films are desired, low energy sources will be employed as power sources. A preferred power source is a radio frequency power source. A low power radio frequency power source will generally have an output of from 3 to 200 Watts, preferably 3 to 50 Watts. In addition to radio frequency as a power source, other power sources (see below) may also be used. In each case, to be compatible with the defined film chemistry which is sought, the power source must be sufficiently nonenergetic to reduce fragmentation and rearrangement of precursor molecules during deposition. That is, the plasma characteristics should be such that the power level of the plasma (determined by the power supply, precursor type, reactor type, etc.) causes sufficient levels of nonfragmented precursors to be present in the plasma to result in selective condensation.

By a "thin" film as used herein is meant a film composed of precursor molecules generally having a thickness of from 5 to 2000 angstroms, preferably 10 to 200 angstroms.

Control of the chemical structure of the thin film is achieved primarily by reducing fragmentation and rearrangement of the precursor molecules so that the precursor molecules are incorporated relatively intact into the thin film as it forms, as compared to conventional techniques. The examples herein illustrate ways to measure the amount of fragmentation and rearrangement of precursor molecules that has occurred during deposition. These methods are generally based on measurements of physical properties, particularly by way of spectral analysis of the films. A film in which the precursor molecules have undergone reduced fragmentation and rearrangement will have physical properties and spectra that more closely resemble the precursor molecules than films which have been formed by conventional plasma deposition techniques.

The chemical properties of the thin films produced by the present techniques will more closely resemble those of the precursor molecules, due to retention of precursor functional groups, than will thin films produced by conventional plasma deposition techniques. Thus, is a precursor molecule contains an amino functionality, a thin film produced by the present technique will retain a higher proportion of amino groups than would a film produced by conventional techniques. The conventional film would contain a greater proportion of chemical species in which the amino group had been fragmented and rearranged into other nitrogen containing moieties.

A semiquantitative method for determining the amount of precursor fragmentation occurring during film deposition involves comparing the XPS spectra of the films with the SPS spectrum of the precursor. Because XPS gives quantitative information on the film's functional groups, the ratio of areas under the SPS spectral peak(s) corresponding to characteristic functional groups of the film to the total area under several or all XPS peaks, as compared to the analogous ratio for the precursor can give an indication of the degree of precursor fragmentation. If a specific carbon-containing functional groups of the film to the total area under several or all XPS peaks, as compared to the analogous ratio for the precursor can give an indication of the degree of precursor fragmentation. If a specific carbon-containing functionality in the precursor is of interest (e.g., C=O, $Cf_3$, etc.) the ratio of the quantity of the fuctionality (area under the appropriate spectral peak) to the total quantity of carbon fuctionalities in the precursor or film (total area under the XPS spectra peaks) is used. Thus, this ratio will be determined for a film of interest, and the corresponding ratio will be determined for the precursor. A fragmentation factor can then be defined by dividing the ratio corresponding to the precursor into that corresponding to the film. If there is no fragmentation, the two ratios should be equal and, therefore, the fragmentation factor will be equal to 1. If there were total fragmentation, the band corresponding to the functional group of interest would be missing altogether in the film (or be very small). In this case, the fragmentation factor would approach 0. The fragmentation factor will thus range theoretically from 0 to 1, 1 being indicative of a lack of fragmentation and 0 indicating complete fragmentation.

For free radical polymerizable precursors, the present invention will generally produce a film having a fragmentation factor of from 0.8 to 1, preferably 0.9 to 1. For ionic mechanism polymerizable precursors, the present invention will generally produce a film having a fragmentation factor of from 0.6 to 1, preferably 0.8 to 1. For nonpolymerizable precursors, the present invention will generally produce a film having a fragmentation factor of from 0.4 to 1, preferably 0.7 to 1. Examples of representative characteristic functional groups for various monomers are presented hereinbelow in a table of exemplary monomers. Conventional films formed by plasma deposition will have fragmentation factors that are lower than those of the present invention.

The above approach to measuring the degree of fragmentation resulting from a plasma deposition process is only one approach, and other quantitative, semiquantitative, and qualitative approaches to determining degree of fragmentation of the precursor may be utilized, if necessary, to determine the degree of fragmentation. For example, elemental analysis of the precursor and films could be employed as an indicator of degree of fragmentation.

In order to maintain a portion of the apparatus at a higher or lower temperature than ambient temperature, various means of temperature control may be used. Generally, any convenient method of temperature control which is compatible with a plasma deposition process and apparatus may be utilized. Low temperatures may be created by use of liquid nitrogen, a dry ice/acetone bath/an ice/water bath, etc. Higher temperatures may be generated by using any standard heating element, circulating heated liquid, etc. Some variation in temperature during the course of the deposition process or, in a sequential process, during or between deposition steps, is tolerable. Preferably, substantially constant coolant temperatures will be maintained during deposition or between deposition steps. By substantially constant is meant that the temperature does not vary more than $\pm 5°$ C., preferably $\pm 3°$ C. most preferably $\pm 1°$ C. The plasma is a source of energy, hence the substrate temperature which has been equilibrated (to some low value, for instance) before deposition, rises somewhat when the plasma is turned on. Therefore, temperature is generally not constant during deposition. By "ambient" temperature as sued herein is meant a temperature of about 21° C.-25° C.

The condensation temperature of the precursor means the condensation temperature under the conditions in the plasma reactor. Such temperature may be estimated for a given precursor taking into consideration the conditions of pressure, etc. in the reactor during plasma deposition. Because of the complex nature of the plasma, it is usually only possible to estimate the condensation temperature using calculations based on ideal, non-plasma conditions. The condensation temperature will not only depend on precursor pressure, but plasma power levels, etc.

Maintenance of a negative temperature difference or differential ($\Delta T$) between the substrate being treated and the surrounding deposition chamber (chamber walls, electrodes, inlet and outlet lines etc). is important to all embodiments of the process. The temperatures of the substrate and chamber walls and, electrodes, inlet and outlet lines etc.) is important to all embodiments of the process. The temperatures of the substrate and the chamber walls and the difference between them will depend on the nature of the precursor being used (especially its vapor pressure) and the film qualities desired. This temperature differential must be sufficient so that preferential condensation (or, in some instances, gaseous adsorption) occurs on the substrate should be maintained near (adsorption) or below (condensation) the condensation temperature of the precursor gas at the working pressure of the reactor so that there is a sufficient concentration of nonfragmented precursor molecules in the vicinity of the growing film to insure the incorporation of desired precursor chemical moieties into the film without excessive fragmentation and rearrangement.

For low boiling precursors—those for which the chamber pressure is equal to or lower than the saturation vapor pressure—the preferred method of achieving this temperature differential is to mount the substrate on a cooled stage during deposition. Examples of these precursors are acetone, 2-hexafluoroisopropanol, ethylene oxide, perfluorobutadiene, and tetrahydrofuran. This stage may be cooled by circulation of a cooling liquid from a controlled temperature bath or by use of a liquid that vaporizes near the substrate contact (e.g., liquid nitrogen). In the case of liquid nitrogen, higher-than-liquid-nitrogen temperatures may be achieved by combining the liquid nitrogen cooling liquid with a heater to achieve stable intermediate temperatures.

Because of the high volatility of these precursors, generating sufficient vapor pressure for sustaining a glow discharge is straightforward. Thus, by reducing the temperature of the substrate below the condensation temperature of the precursor, incorporation of relatively intact precursor molecules into the deposited film is achieved. In some instances (e.g., when using certain nonpolymerizable precursors) it is desirable to cool the substrate to a temperature near, but slightly above, the condensation of the precursor (e.g., within about 5° C.) to obtain optimum film physical properties. Such a methodology would increase the concentration of the precursor molecule in the region of film growth by increasing the amount of equilibrium gas adsorbed.

It should be noted that because the plasma is a source of thermal energy, large temperature gradients can be generated between the surface of the substrate where film growth is occurring and the substrate cooling stage. In some instances (e.g., the simultaneous condensation/plasma deposition embodiment), and accurate method of determining substrate surface temperature is desirable to predict the onset of condensation.

For high boiling point precursors—those for which the chamber pressure is higher than the saturation vapor pressure—predictable chemical functionality is achieved by subjecting the uncooled substrate to condensible vapors. Examples of these precursors are tetraethylene glycol dimethyl ether, and alkyl esters of methacrylic acid (e.g. $C_1$-$C_{25}$ alkyl esters, such as lauryl methacrylate, and octadecyl methacrylate). In this embodiment, the temperature differential between the substrate and the surroundings is maintained by heating all parts of the reactor except the substrate. The chamber must be maintained above the condensation temperature of the precursor to insure that: 1) the system pressure is conducive to maintenance of a stable, low power, low temperature glow discharge (approx. 0.01 to 5 mtorr); 2) inlet lines and outlines do not become fouled with unacceptable amounts of condensate; and 3) there is sufficient vapor pressure of the precursor in the reactor to provide even condensation on the substrate.

The use of low power discharges is especially necessary in the simultaneous condensation/plasma deposition mode to insure a sufficient population of unfragmented precursor molecules in the plasma so that condensation can occur. If the power of discharge is high enough to fragment all of the precursor molecules entering it, condensation of the precursor cannot occur. Therefore, a discharge with sufficient intact precursor concentration for condensation, and with the capability to covalently bond precursors to the substrate at the film surface, is most desirable. We have utilized a capacitively coupled external electrode system with a radio frequency (RF) power source to insure low power capability. Other configurations with different frequency power sources (e.g., direct current or alternating current, such as acoustic, microwaves, etc.) may perform suitably. The low power requirement depends not only on the total electrical power supplied to the plasma, but also on the pressure and nature of the precursor (e.g., molecular weight, fragmentation and ionization cross sections). The inventors found that the easiest way to ascertain whether the power level of the plasma is sufficiently low for maintenance of precursor structure is to compare depositions with and without temperature differential at low and high powers (see FIG. 3). The threshold power limit is dictated by an acceptable level of precursor fragmentation resulting in a desired deposited film functional group concentration. For instance, if a film with 15% carbonyl carbons is necessary or desired from an acetone precursor where $C=O$ is 50% the power of the plasma must be controlled so this fragmentation of acetone in the plasma is limited to a point where enough acetone can condense to obtain the desired film. The degree of precursor fragmentation is likely related to the ratio of of power supplied to the total number of molecules in the plasma (i.e., the pressure). The low power requirement also ensures reasonable cooling load on the cooling stage and reduced film damage by energetic ion bombardment.

Several condensation/plasma deposition schemes can be envisioned using a substrate/wall differential temperature reactor. These range from simultaneous condensation/plasma deposition to an on/off cycling of the plasma discharge. The scheme that is employed in a particular application depends upon the precursor being used and the film properties desired. For example, when using nonpolymerizable precursors, simultaneous condensation/plasma deposition will usually be desired because of the inability of these precursors to undergo propagation reactions which would allow continued film growth in the absence of the plasma. When tightly adherent thin films (which are very uniform) are required, it may be necessary to plasma deposit the precursor before condensation (or simultaneous condensation/plasma deposition) to ensure wetting by the condensate.

It is possible to use several different types of organic functional group containing precursors using this process to obtain films of well defined chemical nature for a wide variety of applications. Exemplary embodiments are listed below.

| Precursors | Exemplary Application | Preferred Mode of Creating a Temperature Differential | Characteristic Functional Group Used to Indicate Fragmentation |
|---|---|---|---|
| I. NON-POLYMERIZABLE | | | |
| Acetone | Cell culture surfaces Functionalizing of surfaces for further chemical derivitization | cooled stage | —$\underline{C}$=O |
| Tetraethylene glycol dimethyl ether | Nonfouling surfaces | heated reactor | —$\underline{C}$—O |
| Hexafluoro-isopropanol | — | cooled stage | —$\underline{C}$F$_3$ |
| II. POLYMERIZABLE | | | |
| a. Free radical polymerizable | | | |
| 2-Hydroxyethyl methacrylate | Contact lenses and other biomaterials | cooled stage | —$\underline{C}$OO— |
| Methyl methacrylate | Photoresists | cooled stage | —$\underline{C}$OO— |
| Perfluoro-butadiene | Elastomeric ultrathin fluoro-polymer films | cooled stage | —$\underline{C}$F$_2$— |
| Methacrylic acid | Drug delivery | cooled stage | —$\underline{C}$OOH— |
| Octadecyl methacrylate | Albumin binding | heated reactor | —$\underline{C}$OO— |
| Lauryl methacrylate | Albumin binding | heated reactor | —$\underline{C}$OO— |
| b. Ionic Polymerizable | | | |
| Ethylene oxide | Nonfouling films | cooled stage | —$\underline{C}$—O |
| Tetrahydro-furan | — | cooled stage | —$\underline{C}$—O |

Additional specific examples of preferred depositions that are carried out in accordance with the present invention are:

1. Volatilized CH$_3$OCH$_2$CH$_2$OCH$_2$CH$_2$OCH$_2$C-H$_2$OCH$_2$CH$_2$OCH$_3$ has been simultaneously RF plasma reacted and condensed in the reactor in order to prepare a poly(ethylene glycol)-like thin, conformal surface coating that exhibited low adhesion to proteins and other biological material that might foul a surface. This behavior has been demonstrated with poly(ethylene glycol) films prepared by rather complex conventional chemical surface reaction schemes on polymeric substrates. The advantage of the deposition scheme proposed here for preparing poly(ethylene glycol) films is that it is amenable to application on any substrate (e.g., nonpolymeric portions of a sensor) and it is also amenable to commercial scale-up using slightly modified conventional plasma processing equipment. Depositions will be examined and characterized using electron spectroscopy for chemical analysis (ESCA), Fourier transform infrared (FTIR) and by protein adsorption measurements (using radiolabelled proteins). In addition, these coatings may be put on commercially available solid-state pH and oxygen sensors.

2. Hydrogel monomers (e.g., N-vinyl pyrrolidone, 2-hydroxyethyl acrylate) and crown ether-containing monomers will be simultaneously introduced into the reactor to form films that should show high selectivity of specific ions (e.g., Na$^+$ or K$+$). The ability to show this enhanced transport for specific ions will be assessed using conventional transport measurement cells and sodium or potassium ion specific electrodes to measure the specificity of the membranes for these ions. Actual sensors will be coated with ion-specific thin films and then they will be tested.

3. Hydrogel coatings (as described in 2. above, but with the crown ether component absent) and poly(ethylene glycol) coatings will be evaluated with regard to their blood interactions. These types of surfaces may be particularly suitable for contact with the venous system, and this technology would allow the depositions to be applied to devices that have been already fabricated and that have appropriate mechanical and handling qualities, but are lacking adequate blood compatibility. Materials would be evaluated by in vitro measurement of the activation of blood factors and in platelet interaction studies.

PREFERRED EMBODIMENT

Poly(ethylene glycol)—HO(CH$_2$CH$_2$O)$_n$H [PEG, also referred to as polyethylene oxide (PEO) or poly(oxyethylene); n=5 to 100,000, preferably 60 to 1000] that is immobilized on surfaces are of great interest to biomaterial and biotechnological device manufacturers because of the nonfouling properties exhibited by these surfaces when exposed to biological fluids or solutions of biomolecules. Herein, the term nonfouling refers to the ability of these types of surfaces to inhibit protein adsorption and cell attachment. Because of these biological properties, PEG surfaces have been suggested for use in a wide variety of biomedical and biotechnological applications including biosensors, contact lenses, intraocular lenses, heart valves, blood storage containers, cell and protein separation systems, catheters, immunoassays, dialysis membranes and enzyme reactors. In addition, application in the food processing industry and where marine fouling is a problem are attractive possibilities. Several theories as to the mechanism responsible for the low protein adsorption and low cell adhesion to these surfaces have been proposed.

PEG's have been immobilized on surfaces by several techniques including surface grafting by exposing a vinyl substituted PEG to radiation, block copolymerization, physical adsorption and complex chemical derivitization schemes. Each of these methods has one or more disadvantages arising from either: 1) the complex protocol required to obtain the PEG surface, 2) limited nonfouling capability, or 3) their inability to be used with a wide variety of substrate materials. Other problems may arise when grafting PEG's onto materials that are susceptible to damage by solvents or ionizing radiation used in conventional grafting techniques.

This aspect of the present invention involves applying the subject method to prepare PEG-like thin films grafted onto a wide variety of substrates using a plasma deposition apparatus. Examples of these substrates are metals, glass, and polymers (e.g., polyethylene, Teflon ™, poly(ethylene terephthalate), polyurethanes, polypropylene, etc.). This method forms a composite, overlayer-substrate system well suited for nonfouling functions when in contact with the biological environment. The technique to be described is simple, inexpensive, and amenable to scale-up to treat a large number of materials of different geometries and chemical natures. In addition, this technique can be used to treat material which are sensitive to the solvents or ionizing necessary for other PEG grating techniques. Furthermore, the thickness of the PEG film resulting from the deposition can be controlled precisely so that ultrathin films (e.g. 10 to 200 angstroms) which exhibit nonfouling properties can be prepared which have a minimal effect on the function of the substrate in the device being treated. This aspect of the invention, and those described above, are illustrated in the following Examples.

EXAMPLES

NONPOLYMERIZABLE PRECURSORS

Analysis of films has been primarily by X-ray photoelectron spectroscopy (XPS), but also by static secondary ion mass spectroscopy (SSIMS).

Materials. Films were deposited on Teflon TM (purchased from Berghof/America Inc., Concord CA), brass (Alaskan Copper and Brass Co., Seattle WA) and glass (V.W.R. Scientific Co., Seattle, WA) substrates. Teflon substrates were cleaned by ultrasonication in 1.0% Ivory soap solution followed by three rinses and ultrasonications in deionized water. Glass substrates were similarly cleaned in 1.5% Isopanasol TM (C. R. Callen Co., Seattle WA) solution. Brass substrates were cleaned by ultrasonication in acetone/methanol solution. Brass substrates were sputter coated with gold using a Denton Vacuum Inc. Desk 1 model sputter coater. Acetone (J. T. Baker Inc., Phillipsburg NJ) and 2-hexafluoroisopropanol (Aldrich Chemical Co., Milwaukee WI) used as plasma precursors were both of greater than 99% purity.

Plasma deposition. A standard radio frequency (RF) plasma reactor was used. See Y. Haque and B. D. Ratner, *J. Polym. Sci., Polym. Phys. Ed.*, 26, 1237–1249 (1988). A capacitively coupled reactor with symmetrical, external electrodes and a 13.56 MHz. E.N.I. Power Systems model HF 650 RF generator is used as the plasma reactor. It is coupled to the capacitance rings on the reactor tube by a matching network. The vacuum system can be pumped down to approximately 5 millitorr by a Stokes vane pump (model 009-2). Flow of precursor gases and pressure inside the reactor are controlled by Vacuum General 80 series flow and pressure controllers. Flow of 2-hexafluoroisopropanol vapors is controlled via a Teflon stopcock leak valve. Once the desired precursor is introduced to the reactor, investigation of the influence of reduced substrate temperature on the chemistry of the plasma deposited film can be conducted by depositing the films on substrates placed on a cooled sample stage.

Substrate temperature control. FIG. 1 shows a detailed view of a prototype tubular reactor permitting deposition at reduced substrate temperatures. A glass cold stage into which a cooling liquid (e.g., methanol) can be recirculated was fabricated. There are several advantages of a glass cold stage including the low electrical conductivity of glass which inhibits the heating of glass by inductive currents, and prevents resistive heating and self bias generation that would arise if the stage were conducting and grounded. A glass glow loop also allows fast temperature change, ease of cleaning and flexibility in fabrication of different cold stage designs. In addition the use of a glass cold stage minimizes the contamination problems experienced with metals. Proper design of the cold stage and a high coolant flow rate insure a large area upon which specimens can be placed with a relatively constant, homogeneous temperature. Methanol or other coolant liquids were cooled by an FTS Systems FT-100 cold probe refrigeration system capable of maintaining temperatures from room temperature to $-80°$ C.

Accurate determination of the temperature of the substrate surface unto which deposition is occurring is a significant technical problem. Temperature measurement by use of thermocouples is difficult because of the signal interference caused by the RF plasma. It may be possible to obtain the desired electrical information from a thermocouple by use of an appropriate filter circuit. Here, temperature measurement have been conducted using a Luxtron 1000A model phosphor-based fiber optic temperature sensing system. Similar systems have been used previously to monitor surface temperatures in a variety of harsh electrical and chemical environments in such processes as the reactive-ion etching of photoresists, oxides and semiconductors. The technique relies on the temperature dependence of decay time of the phosphor, which in this case, is encased at the tip of an optical fiber. The phosphor is both excited and monitored by a central processor via an optical fiber which is introduced into the chamber by a special vacuum connection. The Luxtron temperature measurement system can measure temperature over a range of $-150°$ C. to 400° C. with good accuracy.

Substrates to be treated are placed on the cold stage within the vacuum chamber. Once the chamber is evacuated to a pressure where acceptable low levels of residual gases remain in the reaction system, the substrate samples to be coated can be cleaned by etching with an argon plasma. If liquid precursors are being used they can be degassed by repeated freezing and thawing under vacuum. Coolant can then be pumped from the cold reservoir through the cold stage for a sufficient amount of time to allow thermal equilibration of the cold stage. Deposition can then be conducted in many possible sequences. After the precursor is introduced to the reaction vessel and the pressure and flow have stabilized to the desired set point, the plasma deposition and condensation can be either carried out simultaneously or alternately for any desired length of time. The characteristics of the precursor gas may determine the reaction sequence. For instance, if the precursor contains a double bond by which it can polymerize by a molecular mechanism, it may be desirable to allow the monomer to condense on the substrates and then initiate polymerization with the plasma. Alternatively, a plasma polymer which has been deposited by atomic polymerization may be useful as a sublayer for subsequent condensation-deposition to promote adhesion to the substrate.

After the deposition is complete, it may be desirable to allow the freshly coated specimens to remain in the presence of the precursor for sufficient time to permit the chemical reactions in the film to go to completion. This step is called the quench. Sufficient time should be allowed so that reacting limited by diffusion of quenching species into the film are terminated. If the samples are still cool, it may be desirable to bring them to room temperature to prevent the adsorption of condensibles upon exposure to the atmosphere and to speed up quench reactions.

Analysis of films. Deposited films may be analyzed by a variety of methods. X-ray photoelectron spectroscopy (XPS) or electron spectroscopy for chemical analysis (ESCA) gives quantitative information on the molecular environment of approximately the top 100 angstroms of a surface and is therefore ideally suited for analyzing thin films. XPS can also generate depth profiles of the composition of a surface within the top 100 angstroms as well as compositional X-Y maps of an area of the sample surface. Static secondary ion mass spectroscopy (SSIMS) is an excellent complement to XPS analysis because it is rich in information on the chemical structure of the surface region (approximately 10 angstroms). The SSIMS analysis corroborated the conclusions reported.

The XPS experiments were done on an SSX-100 surface analysis system (Surface Science Instruments, Mountain View, CA) using a monochromatic AlKα X-ray source and a detection system with a 30° solid angle acceptance lens, a hemispherical analyzer, and a position sensitive detector. Deposited film samples were typically analyzed at a takeoff angle of 55°. The takeoff angle is defined as the angle between the surface normal and the axis of the analyzer lens. 0° takeoff angle results in less surface sensitivity than higher takeoff angles and a higher photoelectron flux. Survey scans (0 to 1000 eV binding energy) were run at an analyzer pass energy of 150 eV and an X-ray spot size of 1000 $\mu$ to determine the elemental composition of each film sample. High resolution oxygen 1s (O1s) and carbon 1s (C1s) spectra were obtained at a pass energy of 25 eV and varying spot sizes (depending on the polymer, 150, 300, 600 and 1000$\mu$ spots were used). A low energy electron flood gun set a 5 eV was used to minimize sample charging. The high resolution spectra were resolved into individual gaussian peaks using a least squares fitting program. All Binding energies (BE's) were referenced by setting the maximum of the resolved C1s peak corresponding to carbon in a hydrocarbon environment (CHn) to 285.0 eV.

The C1s spectra have been resolved by constraining peaks to positions common for the various carbon-oxygen functionalities obtained from conventional polymers. A. Kilks, *Electron Spectroscopy: Theory, Techniques, and Applications*, Vol. 4, A. D. Baker and C. R. Brundle, Eds., Academic Press, London, 1981, pp. 277-359. However, these films are of highly complex chemistry and resolved peaks only correspond approximately to the assigned functionalities and should only be used as an estimate of the various functionalities rather than a rigorous quantitative analysis. Ideally, the areas under the resolved peaks are directly proportional to the percentage of the chemical functionality giving rise to that binding energy shift. For example, the peaks centered at a binding energy of 285.0 eV represent carbon in a hydrocarbon environment (i.e., C—(CH$_n$)—C). The peaks at 286.5 represent ether or alcohol carbons, those at 288.9 eV represent carboxyl-type carbons.

RESULTS

Acetone. The general goal of all the deposition experiments was to obtain a thin film that appeared by spectroscopic analysis to be identical to the unreacted, condensed precursor. It is clear that the total molecular integrity of these nonpolymerizable precursors cannot be maintained if they are to be covalently bound into a film matrix, but it was postulated that much of the molecular integrity could be preserved. More complete retention of molecular structural integrity is expected when depositing precursors that can polymerize by conventional means.

Figure 2:
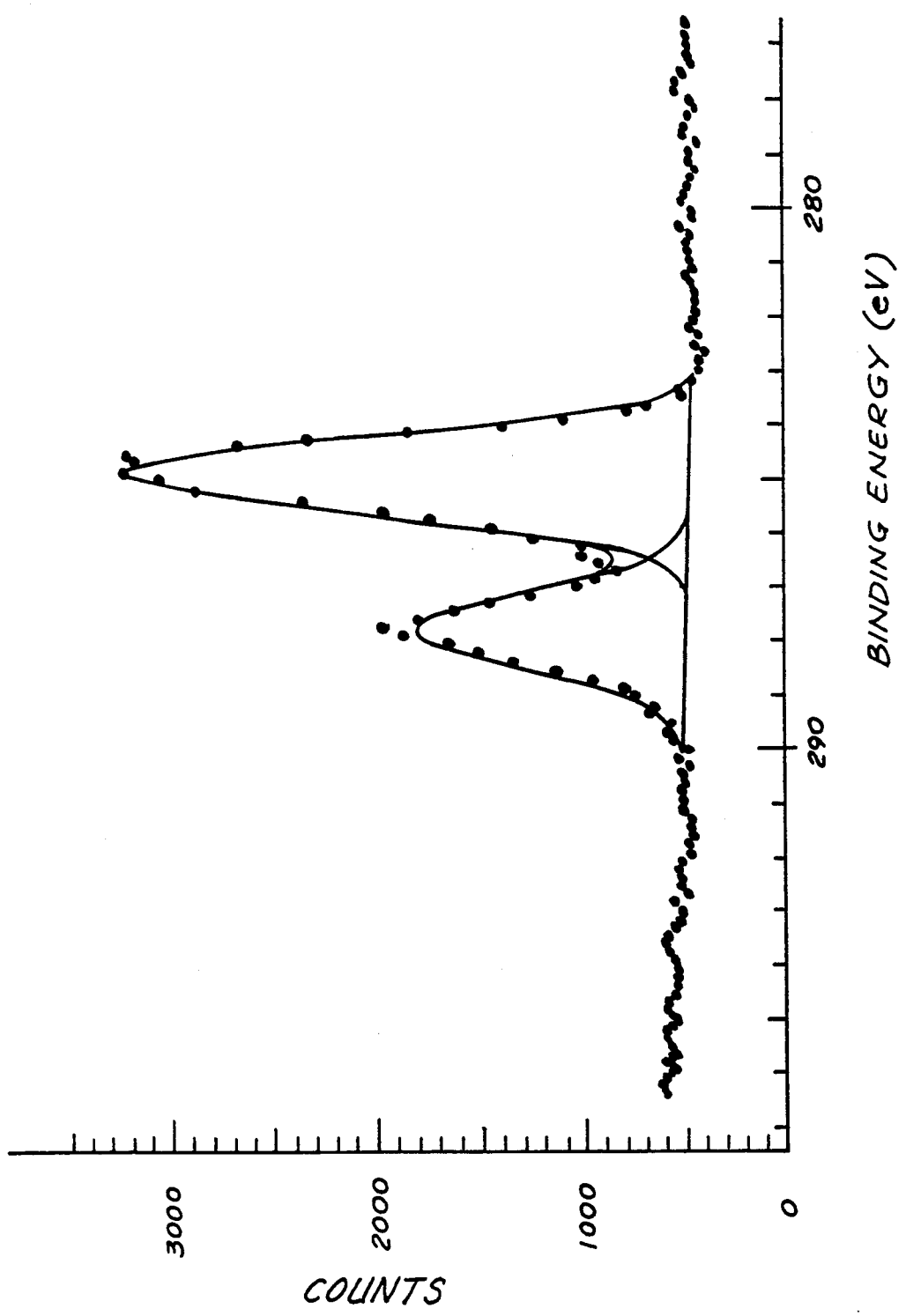
FIG. 2 shows an X-ray photoelectron spectroscopy carbon 1s (XPS C1s) spectrum of a frozen acetone film on cold stage ($-140°$ C.).

Acetone was used as a model precursor for most of the preliminary experiments. Acetone is of interest because of its use in the plasma modification of surfaces used for cell culture. Furthermore, condensed acetone has a characteristic XPS C1s core level spectrum (FIG. 2) showing a hydrocarbon environment at 285.0 eV and a ketone (C=O) environment at 288.0 eV. This spectrum can be used to assess how effectively the molecular integrity of the precursor in the deposited film has been maintained. Acetone cannot be readily polymerized by conventional polymer chemistry.

The initial film depositions using acetone were onto glass substrates at 150 millitorr and 30W RF power. The plasma was applied for 10 min. The temperature of the cold stage was ramped from room temperature to approximately −75°C. The resulting elemental compositions of the films obtained are given in Table 1.

TABLE 1

Effect of substrate temperature on elemental composition of plasma deposited acetone.
Deposition parameters: pressure = 150 mtorr,
power = 30 W, reaction time = 10 min., quench = 10 min.

|  | % C | % O | C/O |
|---|---|---|---|
| Reservoir Temp. |  |  |  |
| 15° C. | 93.3 | 6.6 | 14.1 |
| −15° C. | 92.0 | 8.0 | 11.5 |
| −50° C. | 92.0 | 8.0 | 11.5 |
| −75° C. | 90.4 | 9.6 | 9.4 |
| Theory for acetone: | 75.0 | 25.0 | 3.0 |

Only carbon and oxygen were detected by the XPS. This suggests an overlayer more than 100 angstroms (the maximum sampling depth of XPS) in thickness formed, completely obscuring the silicon signal from the glass. The ratio of carbon to oxygen was seen to decrease as the substrate temperature decreased, but these differences may not be significant. Moreover, in no case did the XPS spectra of the resultant films resemble that of the condensed acetone control film.

Because of the drastic difference between the SPS spectra of the deposited films and the precursor molecule, and the relatively small effect of the temperature of the substrate on the composition of the polymer deposited, it became clear that the plasma parameters used were not optimal. The results indicated that most of the bonds of the acetone molecule were being cleaved in the plasma environment, and that the final deposited film at all substrate temperatures was a result of severe molecular rearrangements. By analogy to the nonconstant pressure systems studied by Yasuda et al., it was concluded that the power to pressure ratio (W/P) that was being used was too high. By using a lower W/P, it was possible to saturate the plasma phase with precursor molecules so that there is only enough energy to fragment a small fraction of the precursor so that the sufficient intact precursor is available to participate in film growth reactions.

Therefore, the next deposition experiment used an acetone pressure of 300 millitorr and 3W RF power. The temperature was ramped from room temperature down to −65°C. A flow controller capable of regulating higher acetone flow rates precisely (0 to 100 sccm) was used in these experiments. Acetone inlet flow was held constant at 41.4 sccm. Because of the lower deposition rates expected with these parameters, the deposition time was increased to 20 min. Samples were quenched in acetone for 10 min. after the plasma was turned off. There is no discernible trend in these data because of nitrogen contamination and insufficient film thickness as suggested by substrate signal in the XPS spectra. The results are shown in Table 2.

TABLE 2

Deposition parameters: pressure = 300 mtorr, power = 3 W, acetone flow = 41.4 sccm, reaction time = 20 min, quench = 10 min.

| Reservoir Temp | % C | % O | % N | % Si | C/O |
|---|---|---|---|---|---|
| RT | 51.9 | 37.8 | 0.9 | 9.4 | 1.4 |
| −10° C. | 70.4 | 29.6 | — | — | 2.4 |
| −35° C. | 69.5 | 29.8 | 0.7 | — | 2.3 |
| −65° C. | 48.2 | 31.7 | 3.9 | 16.2 | 1.5 |

Because of carbon contamination (22) and oxygen (46%) in the glass substrate, the C1s and O1s spectra are not representative of the acetone plasma film alone. The XPS C1s spectra obtained, however, are encouraging in that they indicate that the low power to pressure ratio operating condition produces films that are much closer in molecular structure to the precursor used.

Figure 3:
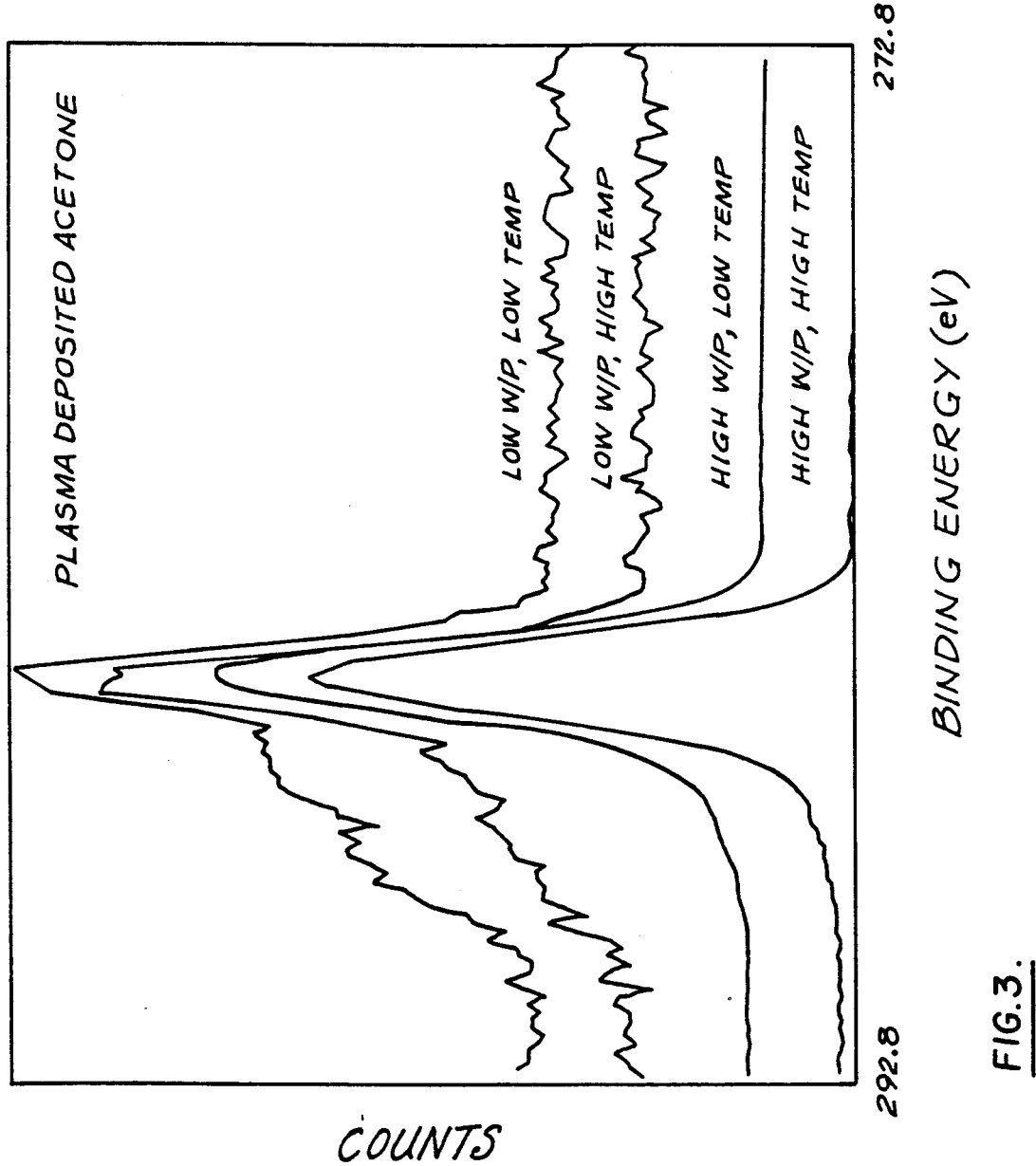
FIG. 3 shown an XPS C1s spectra of plasma deposited acetone.
Figure 4A:
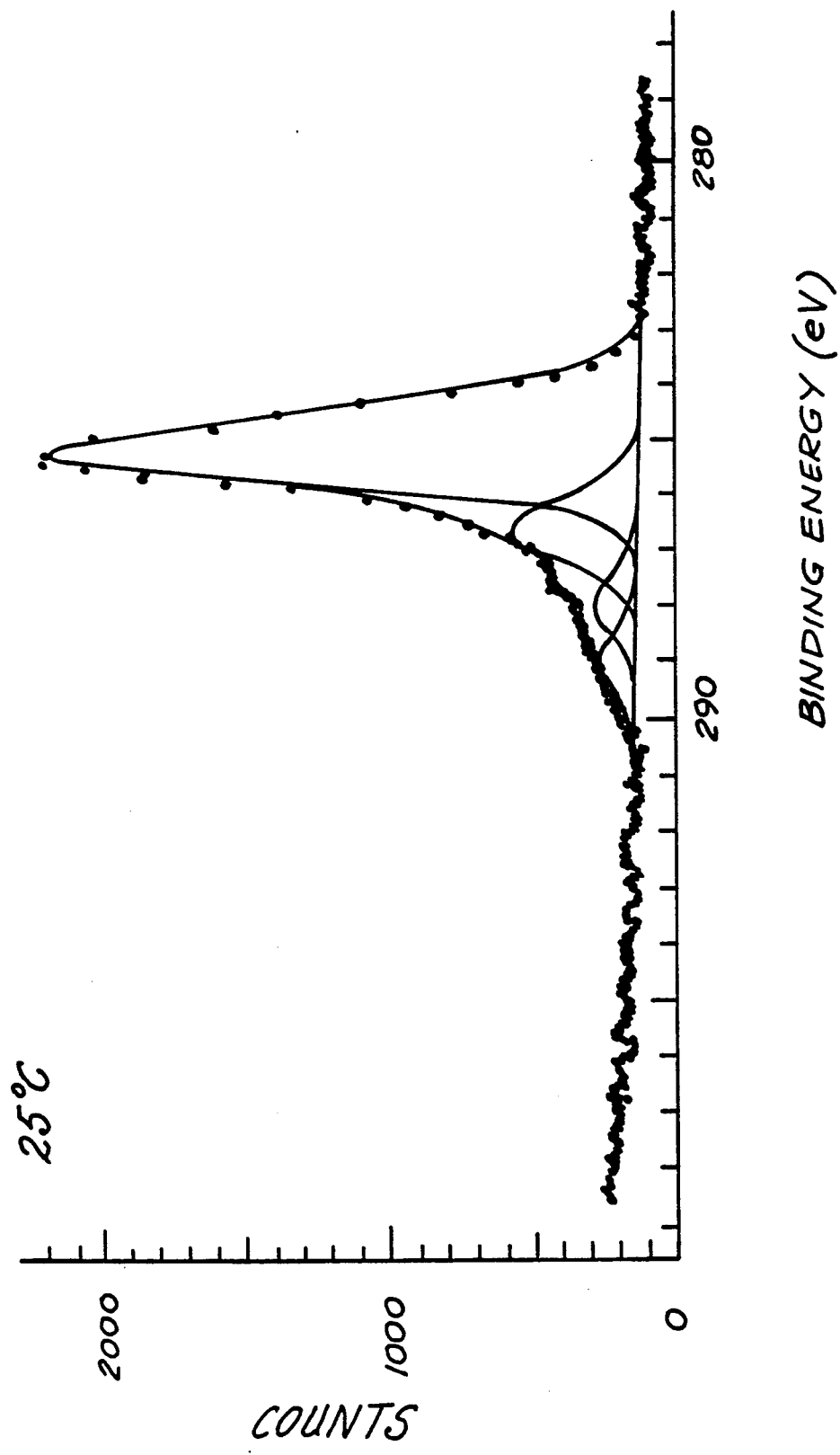
FIGS. 4A), 4B), 4C), 4D) and 4E) show the effect of substrate temperature of XPS C1s spectrum of film of plasma deposited acetone. 20W, 0.3 torr, 41.2 sccm, 20 min.
Figure 4B:
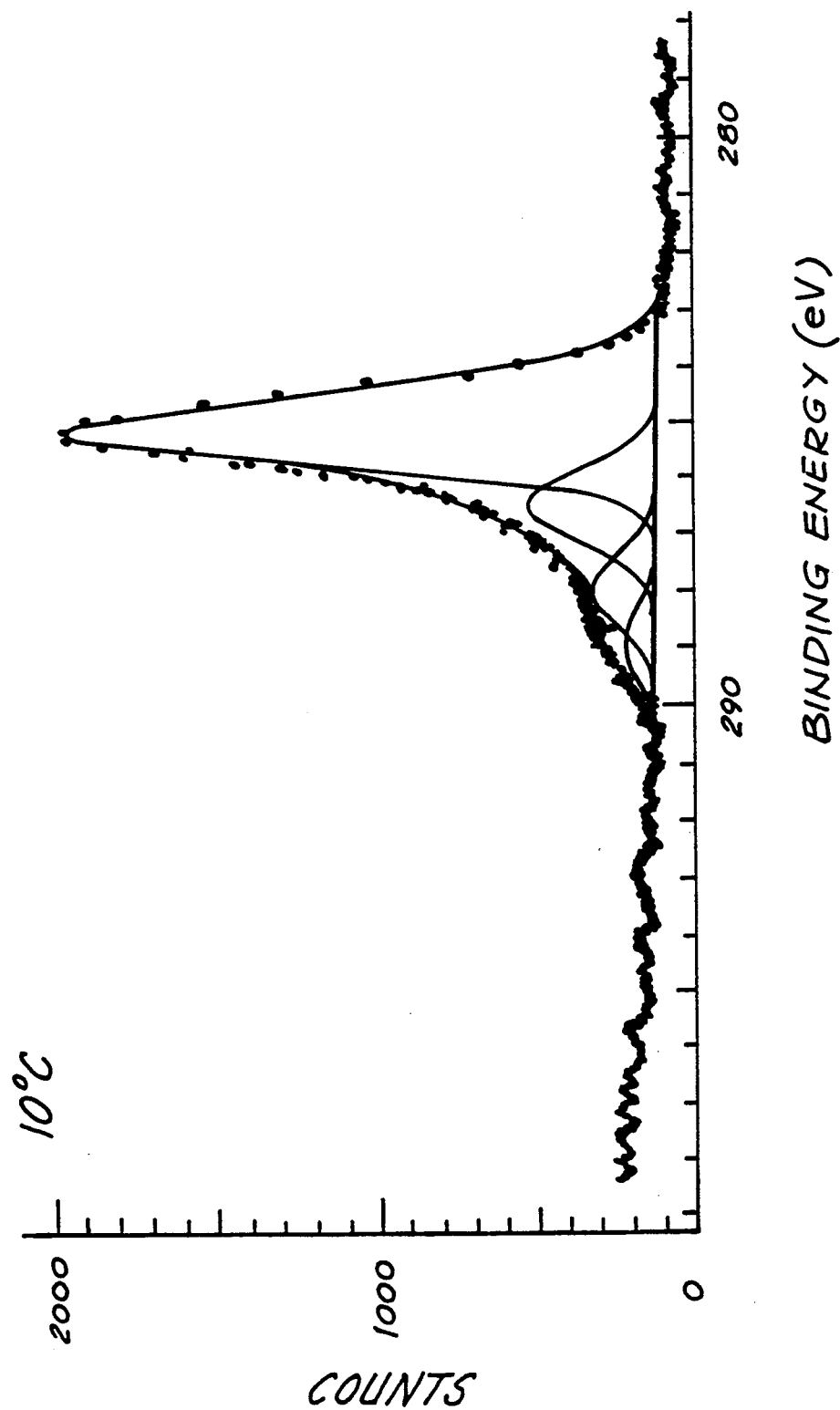
Figure 4C:
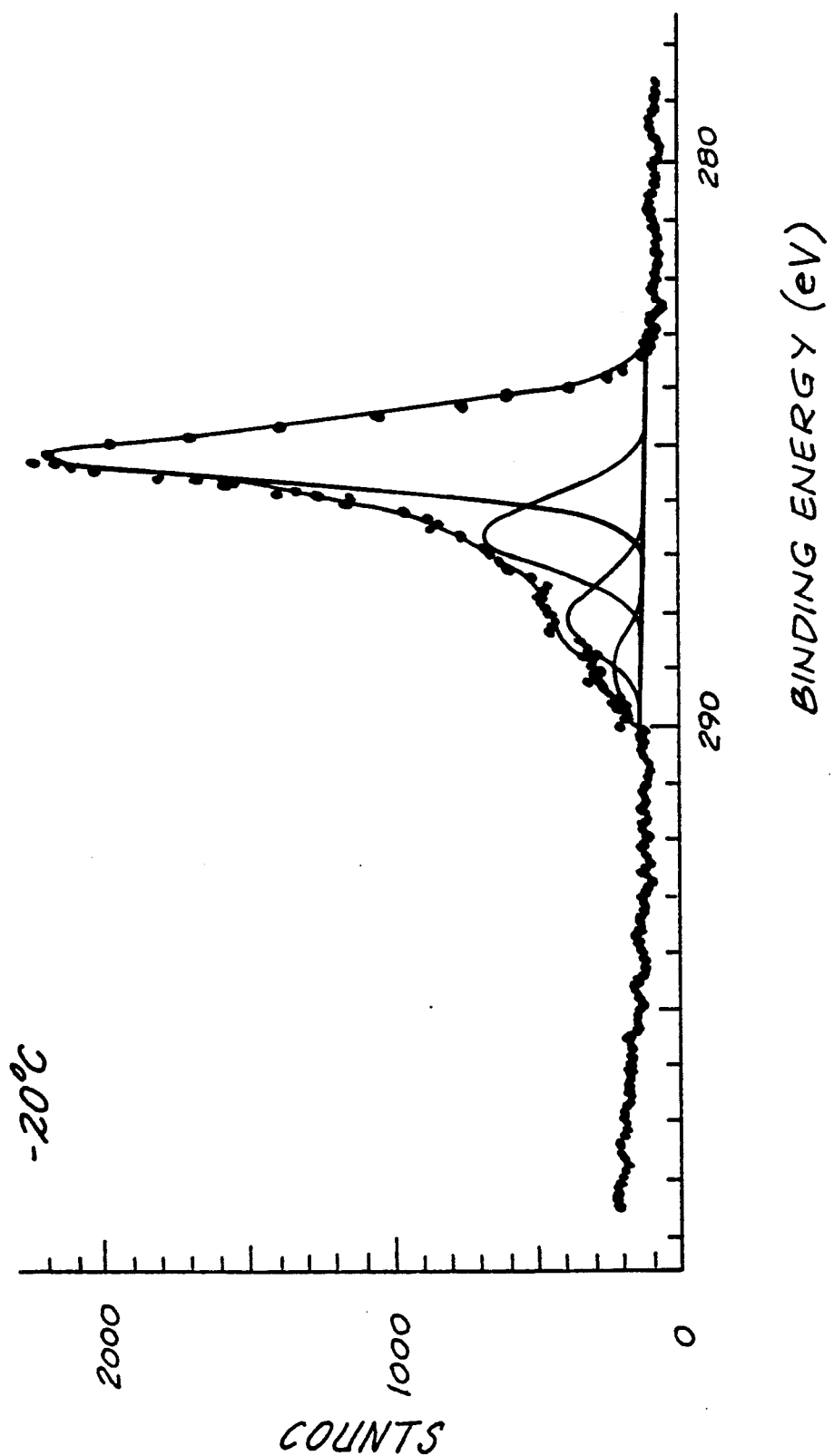
Figure 4D:
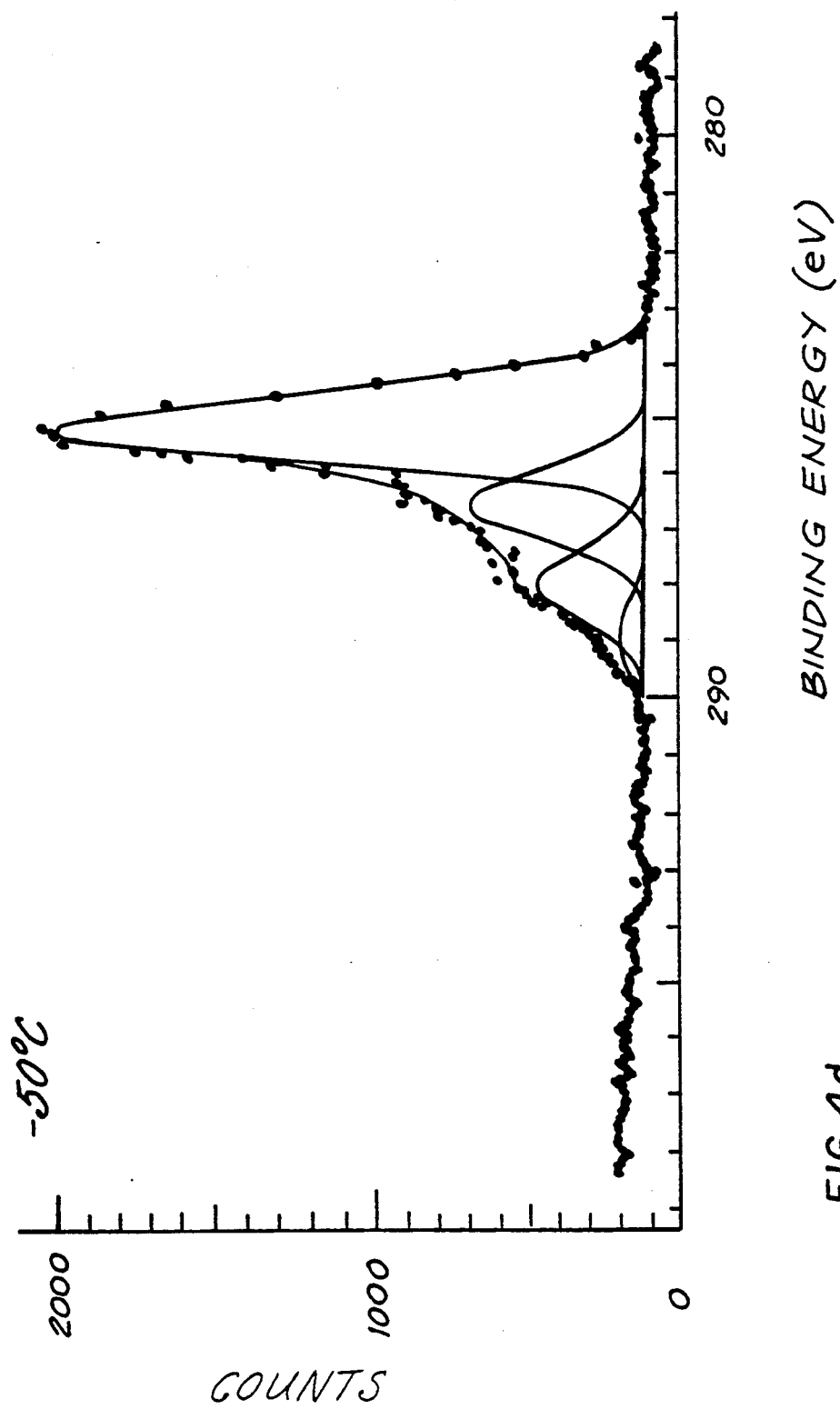
Figure 4E:
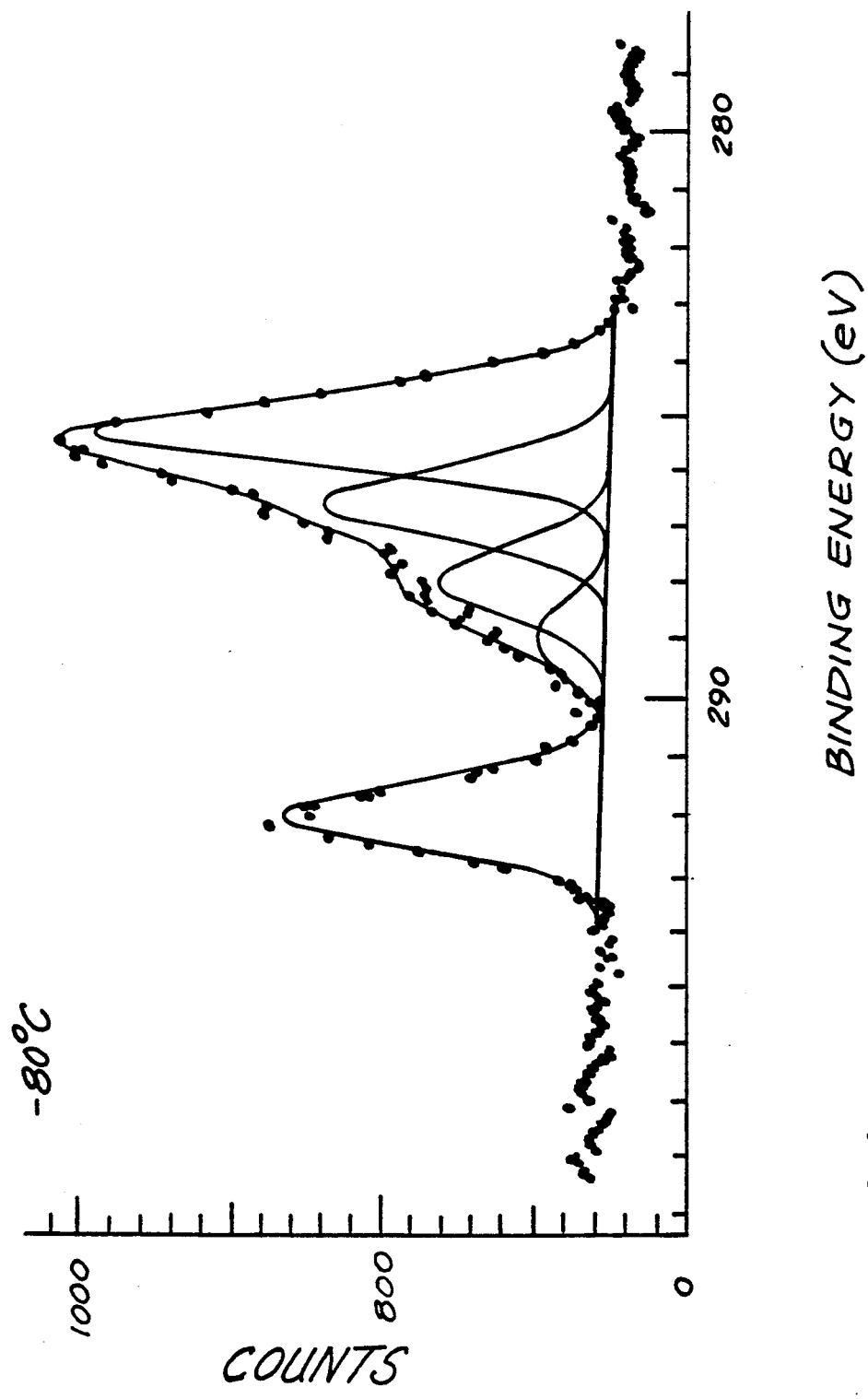

Subsequent experiments used gold sputtered on brass as substrates for depositions at the low W/P condition. The XPS spectra of the gold sputtered substrates still showed some oxygen and carbon contamination, but not as much as glass (40.7% C, 9.28% O). Depositions on the gold surfaces were carried out for 30 min. to try to obtain a thicker layer of polymer. Substrate temperatures of room (ambient) temperature and −60° C. were used. The deposited films were still then enough to see the strongest gold substrate lines in the SPS spectra (5-10%). The gold on brass substrate samples showed a dramatic difference of film composition as the temperature decreased. The carbon to oxygen ratio decreased composition as the temperature decreased. The carbon to oxygen ratio decreased from 3.2 for samples deposited without cooling to 2.0 for samples deposited at the low substrate temperature. FIG. 3 compares C1s XPS spectra of acetone treated samples at low and high power to pressure ratios and at low and high substrate temperatures.

Subsequent experiments with acetone investigated the effect of RF power, pressure and flow rate on the XPS spectra of the films obtained. The experiments show that a low power, high pressure and high flow rate all favor the deposition of films that are closer in elemental composition to the precursor. Because these conditions correspond to a low level of energy per precursor molecule it is evident that the composition trends are a result of less severe fragmentation of the precursor occurring under these conditions. The graphs also show, however, that these same conditions lead to diminished deposition rates as evidenced by the sum of the percent carbon and oxygen signals. The films were deposited on sputter-coated gold and the presence of gold in the XPS spectra indicates a film thickness less than the sampling depth of the XPS. Hence, a lower total carbon plus oxygen percentage indicates a lower deposition rate in the plasma. Therefore, a compromise in these two effects was made and subsequent temperature experiments with acetone were done using 200W RF power, 300 millitorr, and a flow rate of approximately 40 sccm.

Depositions were done at these conditions for 20 min. while the substrate temperature was ramped from room temperature to −80° C. These depositions were done on Teflon TM because it gives a characteristic substrate XPS spectrum that is free of oxygen and hydrocarbon contamination. Hence, any oxygen and hydrocarbon signals from the treated samples can be associated with the plasma treatment. FIG. 4 shows the progression of C1s XPS spectra as the substrate temperature is reduced. The extra peak at a binding energy of 292.0 eV in the sample deposited at the lowest temperature is due to the Teflon substrate. This may indicate that the deposition rate for acetone decreases with decreasing temperature. This may be related to volatilization of a portion of a coating when the substrate temperature is increased after the deposition. These phenomena may be important in the deposition of high quality films, especially for nonpolymerizable precursors.

Figure 5:
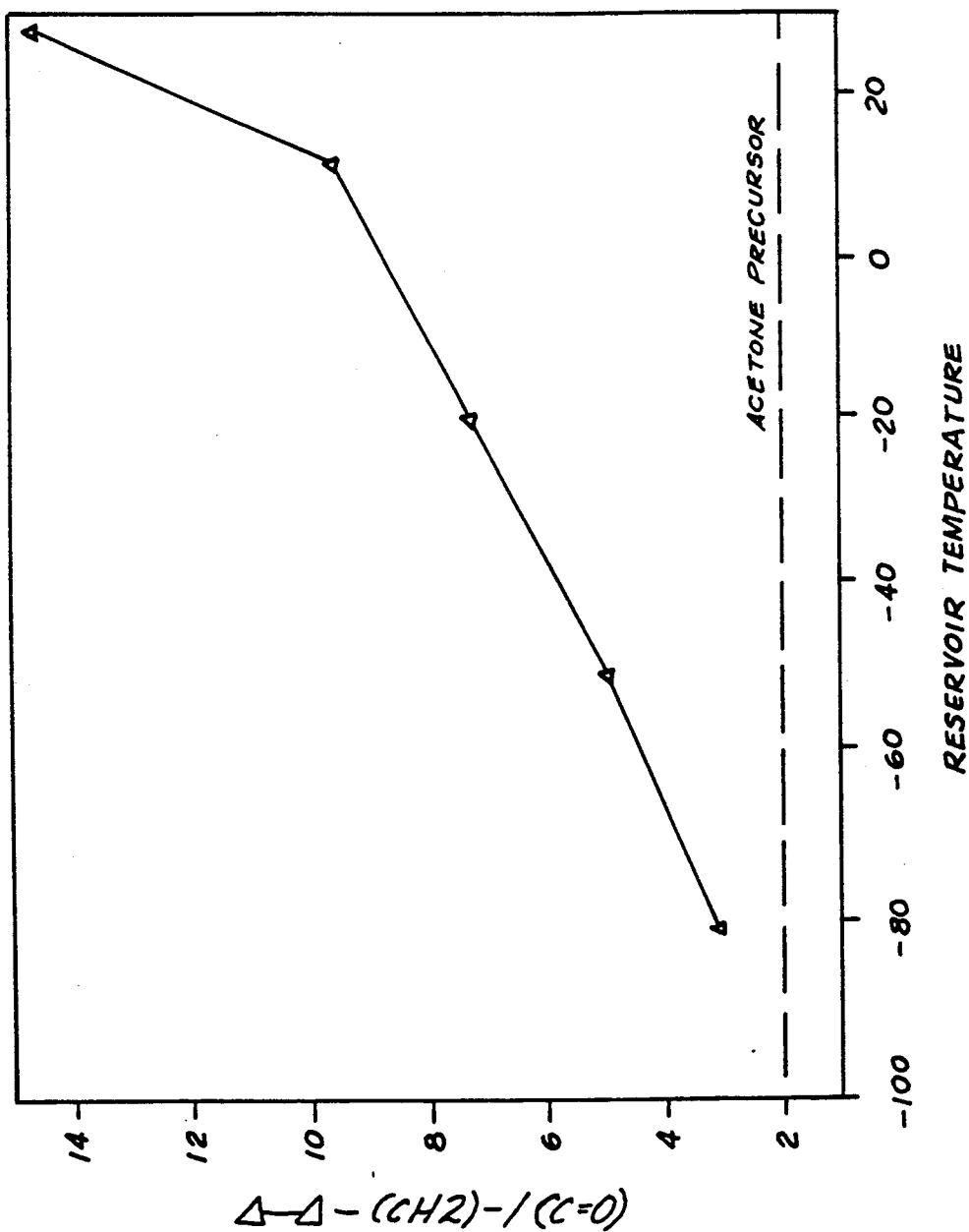
FIG. 5 shows the effect of substrate temperature on ratio of 285.0 eV peak area to 288.0 eV peak area from XPS C1s spectra of films of plasma deposited acetone.

The C1s spectra shown in FIG. 4 have been resolved by constraining peaks to positions common for the various carbon-oxygen functionalities obtained from conventional polymers. FIG. 5 shows the ratio of the 285.0 eV peak to the 288.0 eV peak as a function of the coolant reservoir temperature during deposition. The area of the 285.0 eV peak is an estimate of the hydrocarbon percentage of the film while the area of the 288.0 eV peak is representative of the amount of carbons with two oxygen bonds (e.g., carbonyls). The graphs shows that this ratio approaches that for a pure acetone film as the temperature is decreased. Hence, the XPS spectra give evidence that control of precursor fragmentation in plasma deposition is possible by decreasing the substrate temperature in that it produces films that are structurally more similar to the precursor gas than films prepared by conventional plasma polymerization.

SSIMS and XPS analysis (elemental composition and C1s line-shape) confirmed the usual trend of more acetone-like films being deposited at low temperatures. It was hypothesized that as the substrate temperature was lowered, the amount of rearrangement of the acetone precursor before being incorporated into the film would decrease. The SIMS spectra interpretation yielded several interesting results to support this hypothesis.

Figure 6:
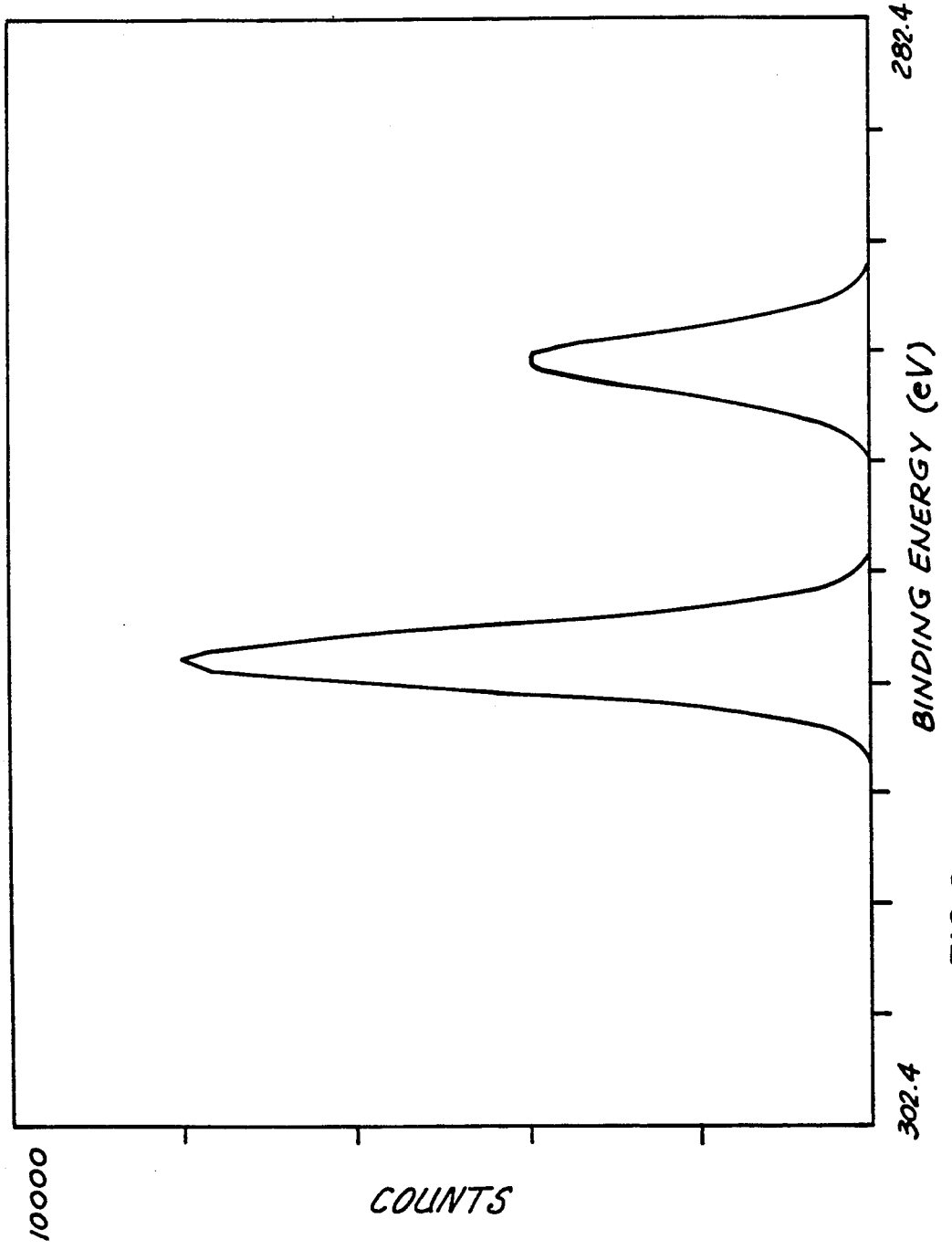
FIG. 6 shows a hypothetical XPS C1s spectrum of 2-hexafluoroisopropanol. Assumed binding energy shift for 2-carbon is 290.7 eV.

2-Hexafluoroisopropanol. Hexafluoroisopropanol (HFIP) was also used as a precursor because it gives rise to a characteristic XPS spectrum and it contains a variety of bonds with different bond strengths. It is also more easily condensed than acetone. The —$CF_3$ moieties give rise to a high chemical shift in the C1s spectrum which can be used as an excellent indicator of the degree of incorporation of these precursor moieties into the film without fragmentation. A hypothetical C1s spectrum for HFIP is given in FIG. 6 which shows the relative amounts of the two carbon environments expected. This spectrum was constructed by placing the peak corresponding to the —$CF_3$ carbons at 294.0 eV and estimating the binding energy shift expected of the central alcohol carbon. This estimation was made by adding the binding energy shifts typically seen for an alcohol carbon (approx. 1.5 eV) to that typical of carbons in the beta position to fluorine containing functionalities (approx. 0.35 eV per fluorine).

Figure 7A:
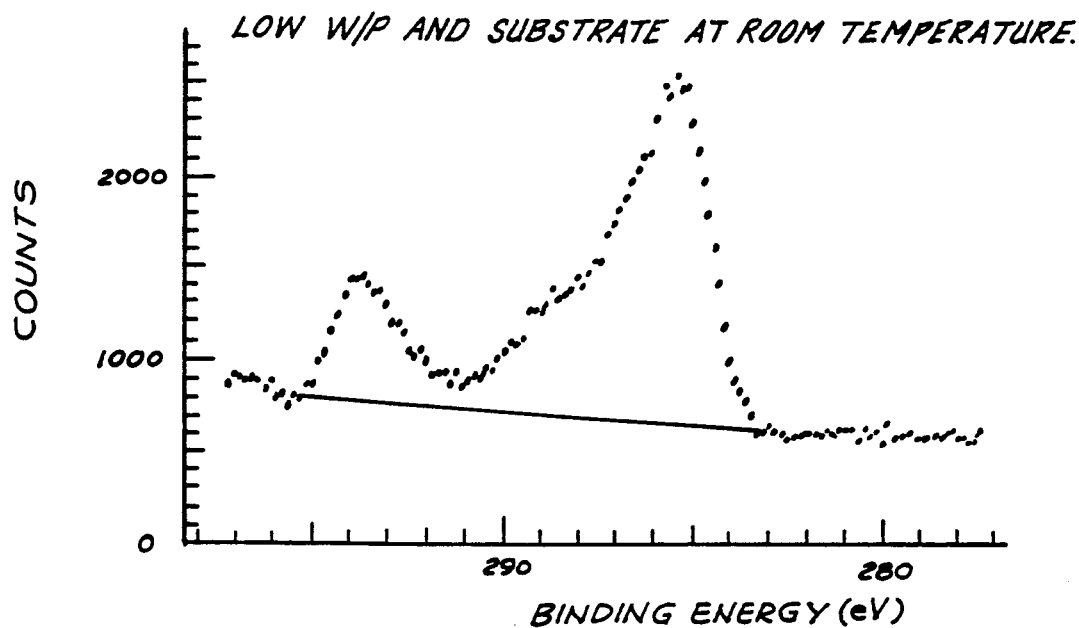
FIGS. 7a) and 7b) show the XPS C1s spectra of film of plasma deposited hexafluoroisopropanol.
Figure 7B:
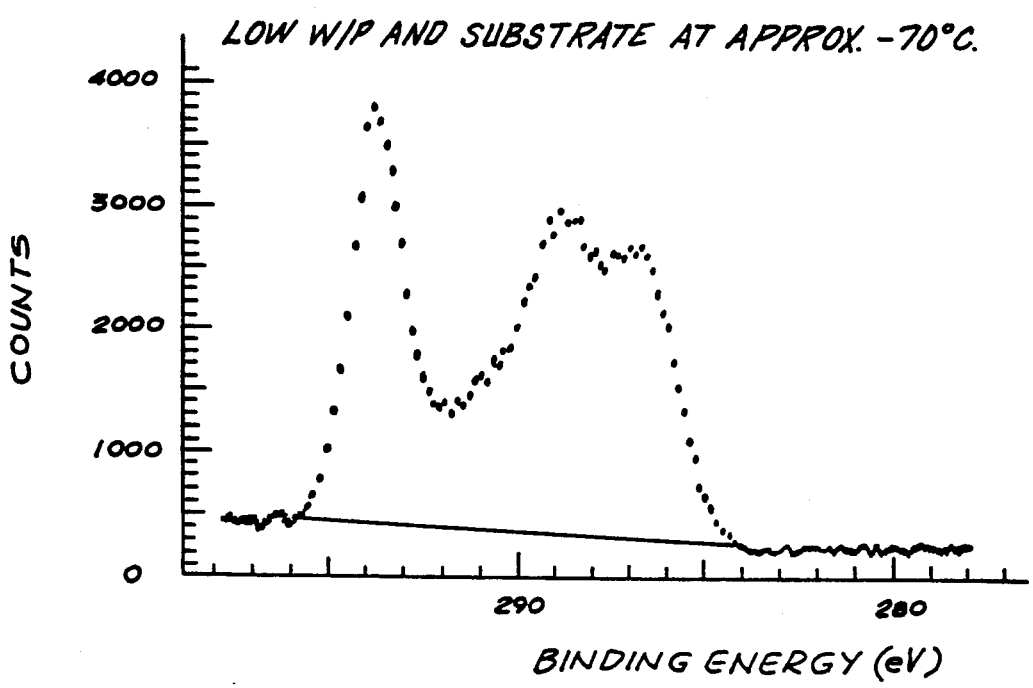

The C1s XPS spectrum of HFIP deposited at high and low substrate temperatures on glass is shown in FIG. 7. At low substrate temperatures, a drastic difference in the C1s envelopes is observed. The low temperature deposition displays characteristics expected for the unfragmented precursor. The large peak at 294.0 eV present in the samples coated at the low temperature indicate that many of the —$CF_3$ groups present in the precursor are being deposited intact.

Deposition of Polyethylene Oxide Oligomers

A 13.56 MHz RF generator is used. It is coupled to the capacitance rings on the reactor tube by a matching network. The vacuum system can be pumped down to approximately 5 millitorr by a rotary vane pump. Flow of precursor gases and pressure inside the reactor may be controlled by flow and pressure controllers. Flow of less volatile precursor vapors is controlled by either a calibrated stopcock or via a variable leak valve. Low volatility precursors (such as tetraethylene glycol dimethyl ether) may be heated in their reservoir to increase their vapor pressure in the reactor during a deposition. More precise flow control of nonvolatile precursors is possible with the use of a mass flow controller designed for use with low vapor pressure liquids and solids. For very nonvolatile precursors, it may be necessary to heat the inlet lines to the reactor and the reactor walls during deposition.

The object to be treated is placed in the vacuum chamber such that an overlayer film is deposited onto its surface when the precursor is introduced into the chamber and a plasma is sustained. A typical protocol might involve the introduction of the precursor at a specified rate so as to maintain a constant pressure in the reactor. The power supply is then used to maintain a plasma at a set power level. Depending on the length of time the plasma is maintained, the thickness of the deposited films may be controlled as desired. In this manner, films may be deposited which do not substantially affect the substrate's bulk mechanical, optical, or electrical properties.

Figure 8:
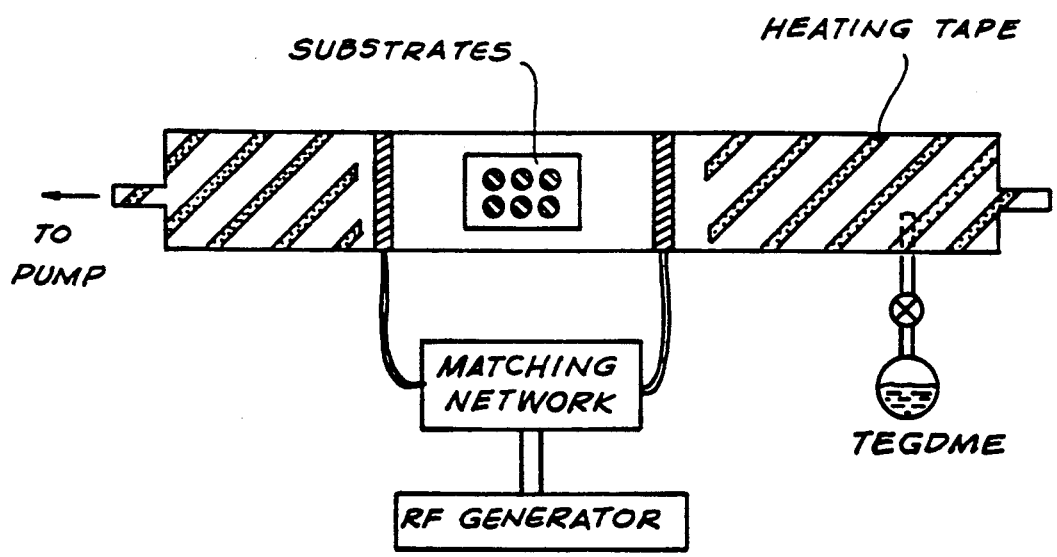
FIG. 8 shows a heated reactor modified for deposition of tetraethylene glycol dimethyl ether (TEGDME).

Desirable precursors for preparing nonfouling surfaces are typically ether-terminated oligomers of poly(ethylene glycol). It is believed that higher molecular weight precursors give rise to better nonfouling properties. This is evidenced by the relatively high protein adsorption levels observed when films are made by the deposition of the PEG monomer, ethylene oxide. The practical limit on the molecular weight of these precursors for plasma deposition is imposed by their vapor pressure. As the molecular weight of the oligomeric precursors is increased, more heating is required to get the precursor into the vapor phase where it can be plasma deposited onto the substrate. As a compromise, data is reported for depositions of tetraethylene glycol dimethyl ether (TEGDME). This precursor requires only reactor heating and gives rise to good quality films with excellent nonfouling properties. This molecule was initially chosen because the methyl endcaps should make it more volatile than its hydroxyl-terminated analog. It is emphasized that this molecule was chosen only as a convenient example and many other similar derivatives could be used to obtain nonfouling films by this process. For instance, di, tri, tetra, penta, and hexa, ethylene glycols will yield films which exhibit related protein adsorption characteristics. In addition, different ether terminal groups may be used as well as a variety of other terminal functionalities. For example, hydroxyl, methyl, ethyl or epoxy terminated analogs may be used. Mixtures of precursor vapors (both poly-ether and others) may also be used to deposit films with nonfouling properties. FIG. 8 shows a heated reactor for the deposition of TEGDME.

It is also believed that a low power is preferable in the deposition of these films for enhanced nonfouling performance, so long as the power is enough to form an appreciable deposition on the substrate. This reasoning follows from the hypothesis that it is the poly(ethylene glycol)-like, hydrogel nature of these films that is responsible for their resistance to biofouling. As the power of the discharge is increased, increased fragmentation and ionization of the precursor occurs, yielding the deposition of a film whose chemical structure is more amorphous and is highly crosslinked. This film is expected to be less PEG-like than those deposited at relatively low powers.

Protein adsorption measurements were done using $I^{125}$ radiolabeled proteins. Samples were hydrated overnight in citrated phosphate buffered saline with azide and iodide added (CPBSzI). Samples were then exposed to protein (fibrinogen or albumin) in buffer solution for a specific adsorption time. Samples were then sheared, rinsed thoroughly and retained radioactivity was then assayed.

Figure 9:
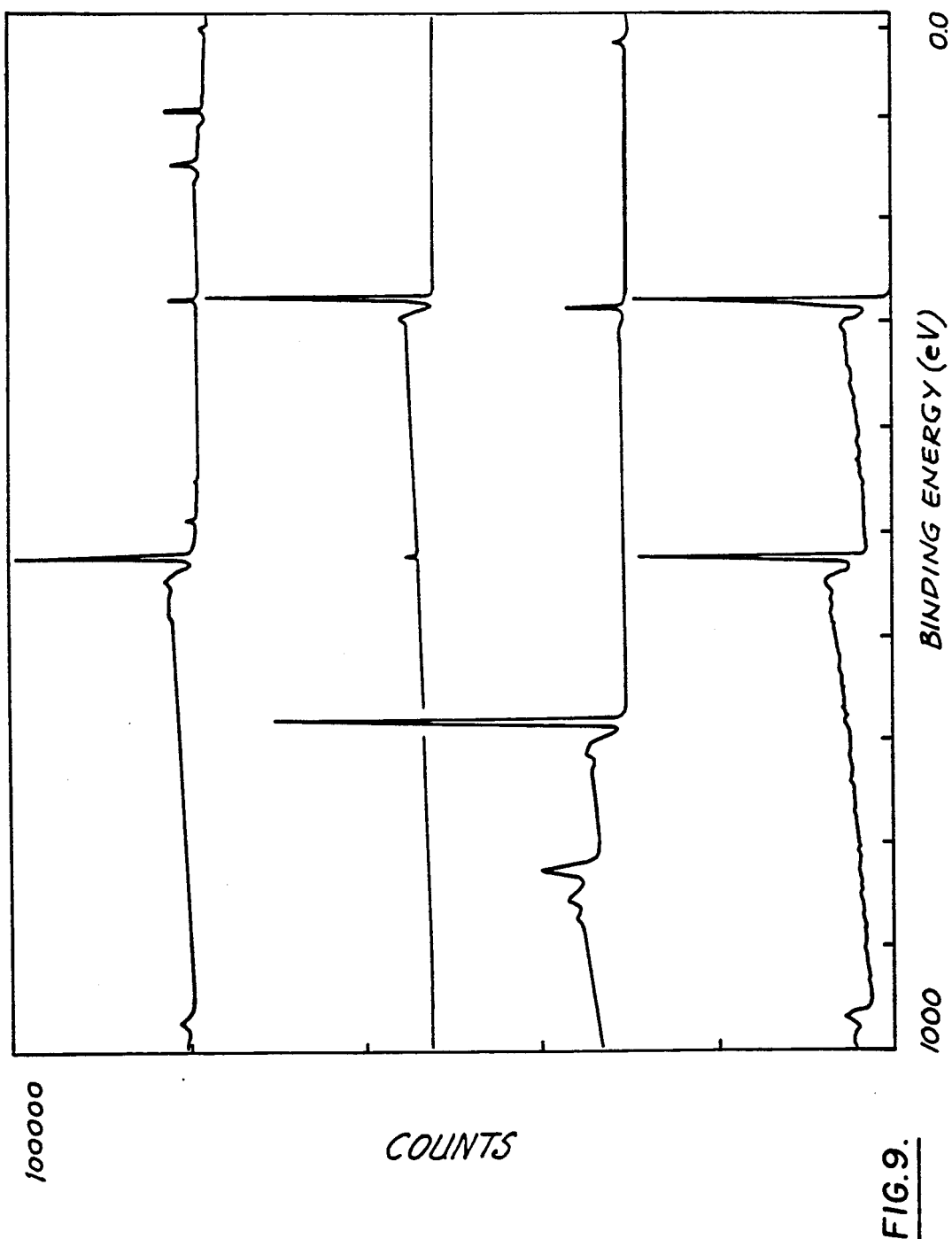
FIG. 9 shows the XPS spectra of glass polyethylene (PE), poly(tetrafluoroethylene) (PTFE), and poly(ethylene terephthalate) (PET) substrates.
Figure 10:
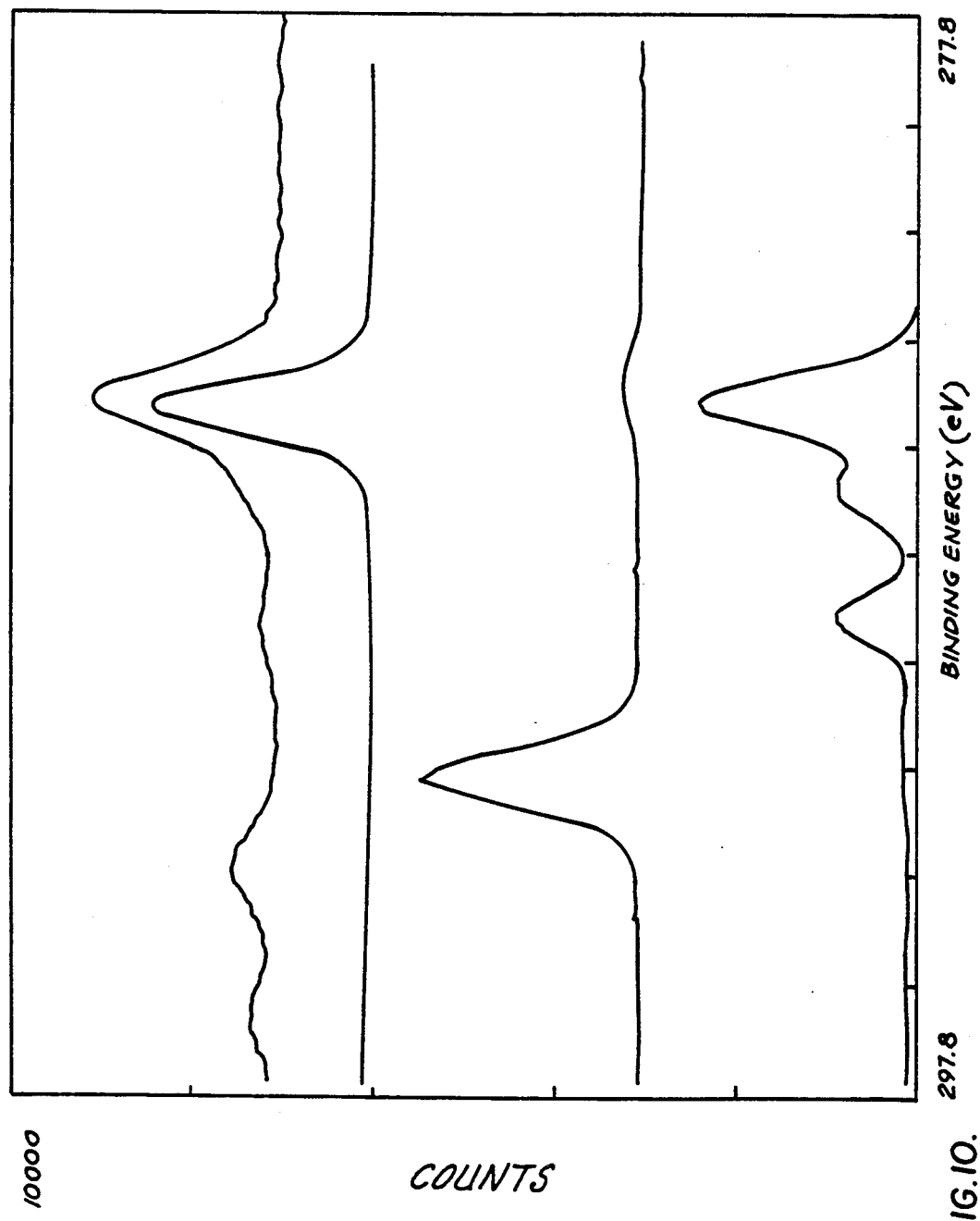
FIG. 10 shows the XPS C1s spectra of glass, PE, PTFE and PET substrates.

FIG. 9 shows the ESCA survey spectra of for substrate materials; glass, polyethylene (PE), poly(ethylene terephthalate) (PET), and poly(tetrafluoroethylene)(PTFE) before plasma treatment. The survey spectra give an estimate of the elemental composition (with the exception of hydrogen) of the surface region (approx. 0 to 10 nm deep) of the sample. These substrates were investigated not only because of their different chemistries and surface energies, but also because of their applications in medicine and biology. FIG. 10 shows the ESCA C1s spectra of these material. The C1s curve shape gives an indication of the types of carbon species present in the surface region of the sample. By observing the changes in the C1s curve shape after a deposition, changes in surface chemistry produced by deposition of the film can be investigated.

Figure 11:
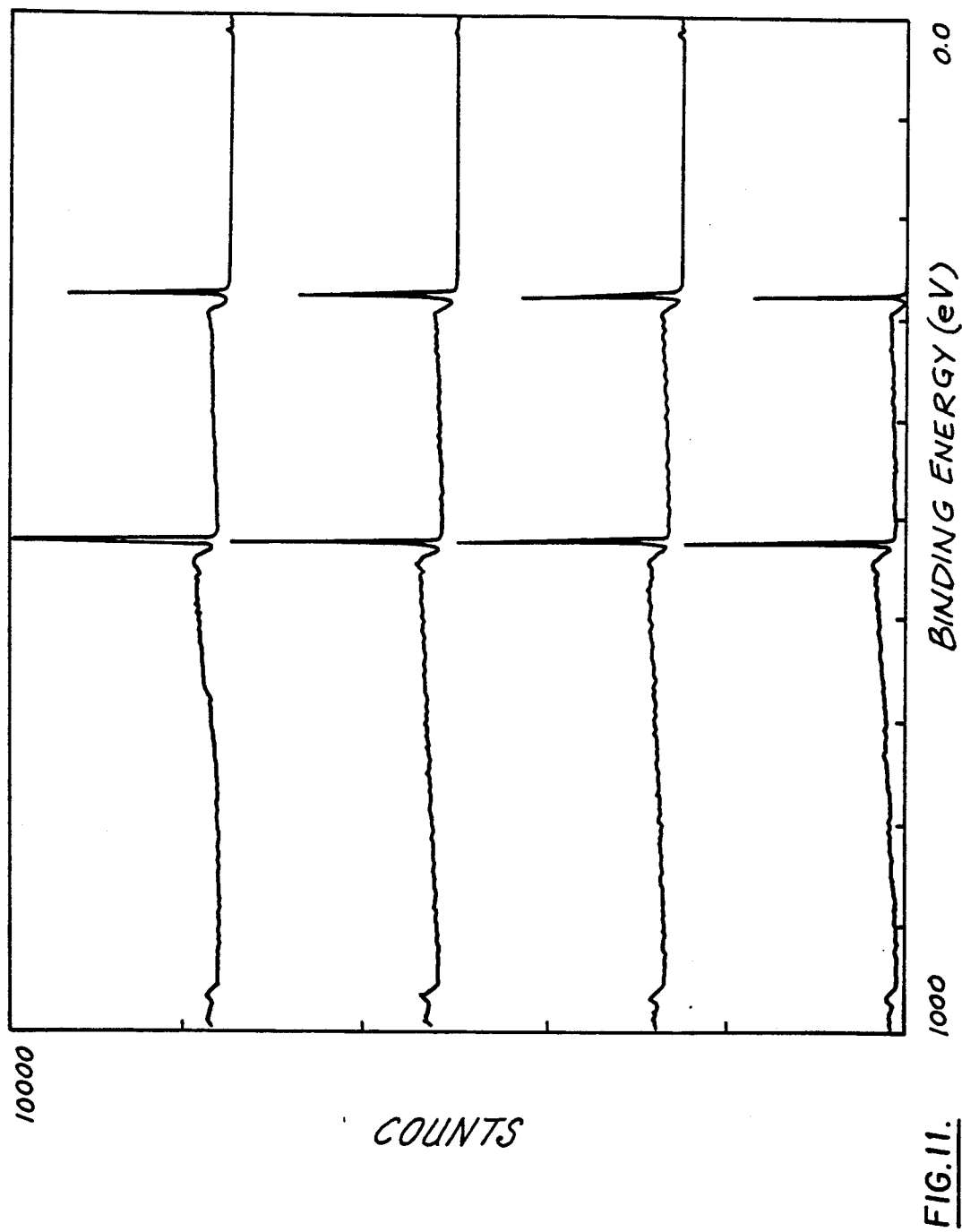
FIG. 11 shows the XPS spectra of plasma deposited TEGDME on glass, PE, PTFE and PET substrates.
Figure 12:
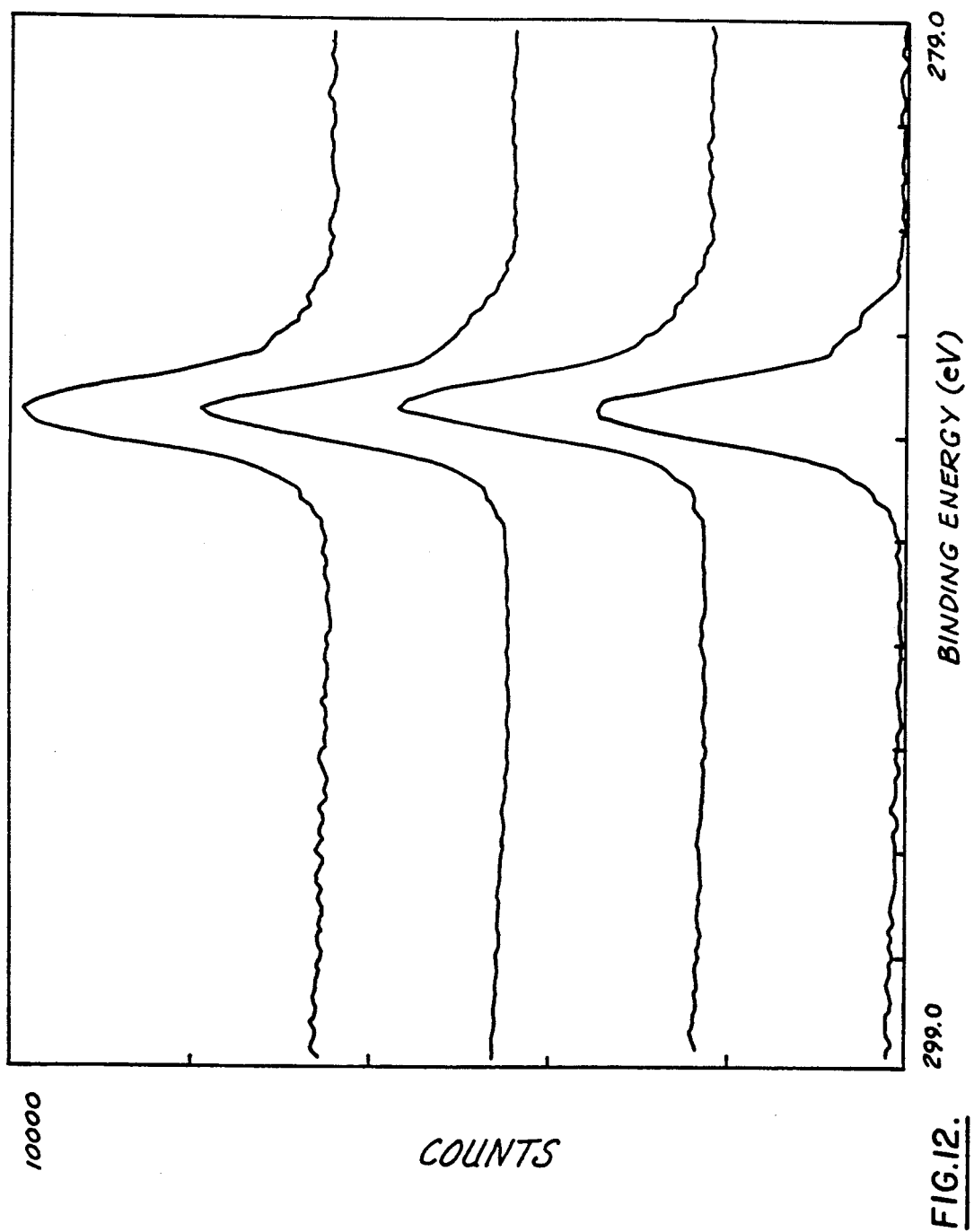
FIG. 12 shows the XPS C1s spectra of plasma deposited TEGDME on the four substrates.

Deposition conditions for the four substrates were identical. The TEGDME reservoir, inlet lines and the reactor walls were heated and vapor flow into the reactor was not metered. The pressure during the plasma was approximately 275 mtorr. The plasma was applied for 10 min. FIG. 11 shows the ESCA survey spectra of the deposited films on the four substrates. The EXCA elemental compositions of all the deposited films are almost identical and very close to the composition expected for poly(ethylene glycol)(66.6%, 33.3% O). FIG. 12 shows the C1s spectra of the films. The C1s spectra of the four types of samples are virtually identical and indicate the preponderance of ether-carbon functionalities expected for poly(ethylene glycol)-like films.

It should be emphasized at this point that the plasma deposition of these vapors is not, under these conditions, equivalent to the polymerization of ethylene oxide or ethylene glycol as in the manufacture of poly(ethylene glycol). In contrast to the well characterized reactions that give rise to such polymers of high chemical regularity, the mechanisms of film growth in the plasma environment are quite complex and typically give rise to films of irregular and complex chemistry. It is most likely that the superficial resemblance to PEG of these plasma deposited films under ESCA analyses would not be confirmed by analytical techniques (e.g., NMR) which are more sensitive to structural differences in macromolecular chemistry. As mentioned previously, the plasma deposition parameters used to obtain the films analyzed here by ESCA and protein adsorption experiments have been chosen to obtain PEG-like films. If a higher plasma power, or a lower molecular weight PEG oligomer had been used, a less polyether like film would have been obtained which would probably have exhibited higher protein adsorption levels.

Polyethylene substrates were then treated in a similar fashion for protein adsorption measurements. The first experiment done was a fibrinogen adsorption from a solution of 0.1 mg/ml protein in CPBSzl for 1.0 min. Fibrinogen adsorption to the TEGDME plasma treated samples was less than 1.0 ng/cm$^2$ (actually 0.9±0.6 ng/cm$^2$). The high variance is due to the fact that radiation levels measured to calculate this adsorption are on the order of the background levels. This is an extremely low fibrinogen adsorption, especially when compared to that of the untreated polyethylene substrate at the same conditions (approx. 350 ng/cm$^2$).

Figure 13:
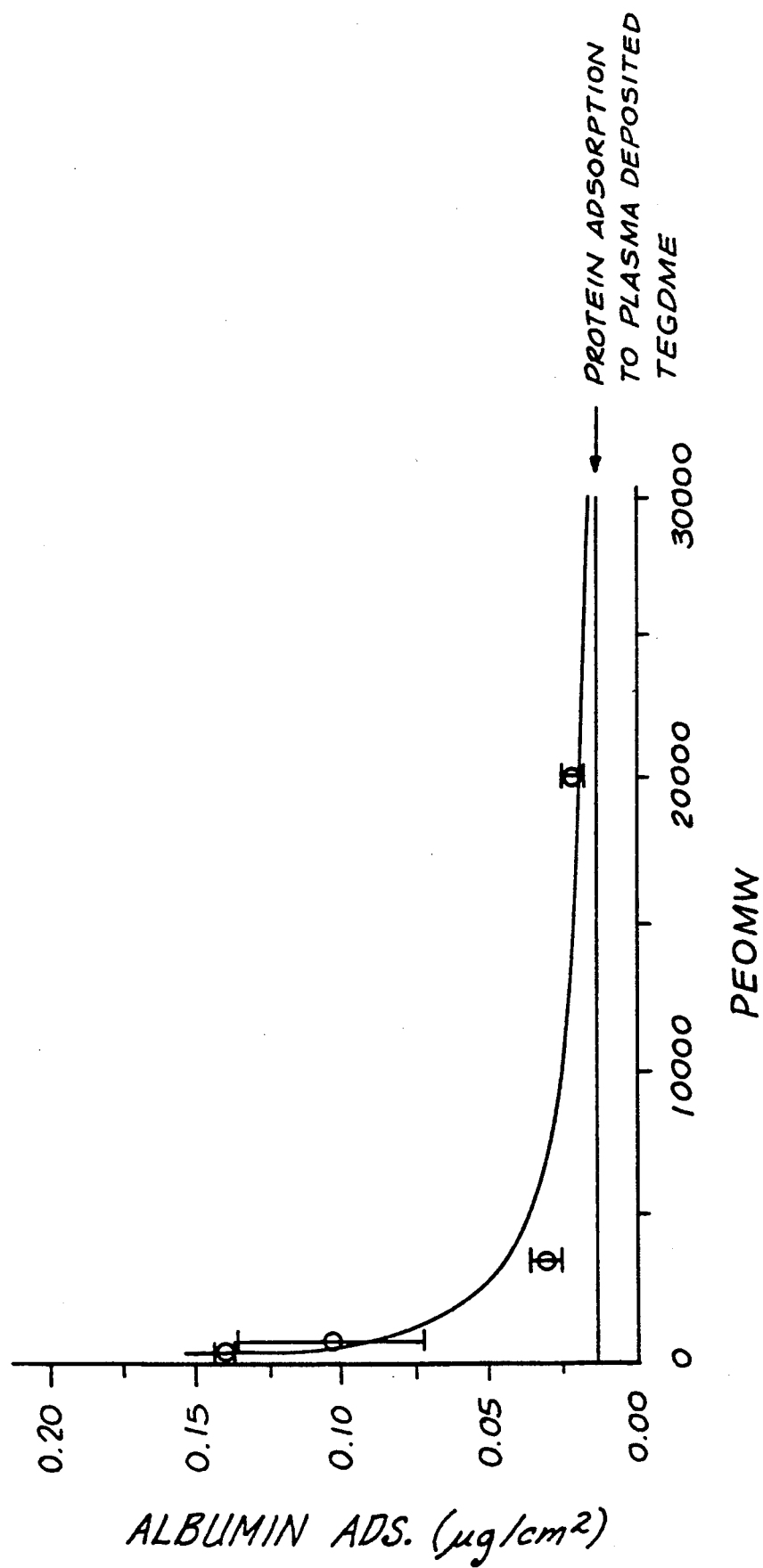
FIG. 13 compares the albumin adsorption to immobilized poly(ethylene oxide)(PEO) and plasma deposited TEGDME.

The second set of measurement done was of albumin adsorption onto TEGDME plasma treated polyethylene. The adsorption was from a 0.2 mg/ml albumin solution in CPBSzl for 2.0 hrs. Albumin adsorption to these samples was 17.2± ng/cm$^2$. Again, this is extremely low protein adsorption when compared to the untreated substrate. It is also low, however, when compared to other immobilized PEG surfaces. FIG. 13 compares the albumin adsorption on these samples with adsorption at similar conditions to surfaces which have been grafted using conventional wet-chemical immobilization methods with PEG molecules of varying molecular weight. W. R. Gombotz, Ph.D. Thesis, University of Washington (1988). The method for immobilizing the PEG molecules used in the previous study was considerably more complex than that disclosed here, yet plasma deposition of TEGDME resulted in lower protein adsorption than even the highest molecular weight PEG immobilized previously.

The results presented in this section of Examples indicate that this method of plasma depositing PEG's is a simple, inexpensive and effective way to produce nonfouling surfaces on a wide range of biomaterials. Nonfouling properties may be achieved by deposition of even ultrathin films that do not alter the function of the underlying substrate. Hence, material whose utility is derived from some bulk property such as strength or refractive index may be easily treated to have more desirable biological interface properties.

Because of the burgeoning importance of biological material interactions to biotechnology and biomedical device manufacturers, it is believed that the process presented in a highly valuable technique for improving the performance of certain biomedical and biotechnical apparatus.

The behavior in plasma deposition at reduced substrate temperatures of the examples of nonpolymerizable precursors described above (i.e., acetone, HFIP and tetraethylene glycol dimethyl ether) show that using a negative temperature differential between the substrate and the rest of the reactor apparatus can render film deposition more predictable and controllable. This increase in chemical predictability is attributed to reduced fragmentation of precursors being incorporated into the growing film at reduced temperatures. The explanation of the mechanism of incorporation of precursor moieties which have a low degree of fragmentation is based on the assumption that decreasing the substrate temperature leads to preferential condensation (or adsorption) of low energy, unexcited gaseous species and, therefore, increases the concentration of nonfragmented molecules in the film growth region. Chemical specificity of the film is, therefore, achieved by the incorporation of unfragmented or only slightly fragmented precursors into the film matrix by the reactive species generated by the plasma.

Although other methods have been proposed for reducing precursor fragmentation and, hence, increasing film chemistry predictability, reduction of the substrate temperature is the only one that does not reduce the rate of film deposition. Other researchers have found an increase in deposition rate as the substrate temperature is reduced.

POLYMERIZABLE PRECURSORS

General. Polymerizable precursors are the most widely studied precursors in plasma depositions. These include any precursor which may commonly form diradicals and polymerize by a self propagating mechanism. Those addressed here include vinyl substituted monomers and certain monomers which may polymerize via a ring opening reaction. It was hypothesized that the molecular integrity of precursors used be maintained in depositions when using polymerizable precursors. Because the double bond provides a well defined, reactive bonding site, the XPS spectrum of the film produced is almost identical to that of the precursor. In addition, polymerizable monomers may provide a means of the plasma phase. Conventional chemical polymerization methods can form polymers of these materials, but tightly adherent extremely thin coatings of polymers are hard to produce.

Experimental. Flow of precursor gases and pressure inside the reactor are controlled by Vacuum General 80 series flow and pressure controllers. Flow of less volatile precursor vapors is controlled via a Granville Phillips 203 variable leak valve or a Teflon stopcock leak valve. Low vapor pressure monomers may require reservoir, inlet lines and in some cases the entire reactor assembly to be heated with heating tape.

With the exception of some of the plasma deposited ethylene oxide samples, all XPS binding energies (BE's) were referenced by setting the maximum of the resolved C1s peak corresponding to carbon in a hydrocarbon environment CHn) to 285.0 eV. Because no dominant hydrocarbon peak is present in some of the plasma deposited ethylene oxide C1s spectra, BE's for this polymer were referenced by setting the maximum of the C1s peak corresponding to carbon in an ether environment (CHn—O) to the binding energies observed for this functional group in the other ether containing polymers (e.g., poly (tetramethylene glycol)). Reference.

SSIMS Analysis. The SSIMS of poly(hydroxyethyl methacrylate) and the plasma deposited hydroxyethyl methacrylate were also done on the SSX-100 surface analysis system. The primary ion source was a 3.5 keV, 1.5 nA Xe+ beam produced from a differentially pumped Leybold-Hereas ion gun. The sample is bombarded over a 3 mm diameter area during data acquisition. The total ion dose during data acquisition was $1-2\times10^{-13}$ ions/cm$^2$, which ensured that static SIMS conditions were met. The secondary ions were detected by a modified QMG 511 Balzers quadrupole mass spectrometer equipped with an adjustable energy filter. The takeoff angle of the detected secondary ions was near normal. A low energy flood gun set at 32 eV (positive secondary ions) or 80 eV (negative secondary ions) was used to minimize sample charging.

SSIMS of plasma deposited acetone films was performed by David Briggs (ICI PCL, Wilton Materials Centre, Middlebrough, Cleveland, UK) on a surface analysis system based on the VG scientific ESCALAB. The primary ion source was a 4keV Xe+ beam produced by a differentially pumped AG 61 ion gun. The film samples were rastered over an area of 6 mm×6 mm. The total ion dose during data acquisition was $<10^{13}$ ions cm$^{13}$ ions cm$^{-2}$. Secondary ions were detected by a VG—12 quadruple mass spectrometer. Sample charging was minimized by flooding with 700 eV electrons.

Figure 14:
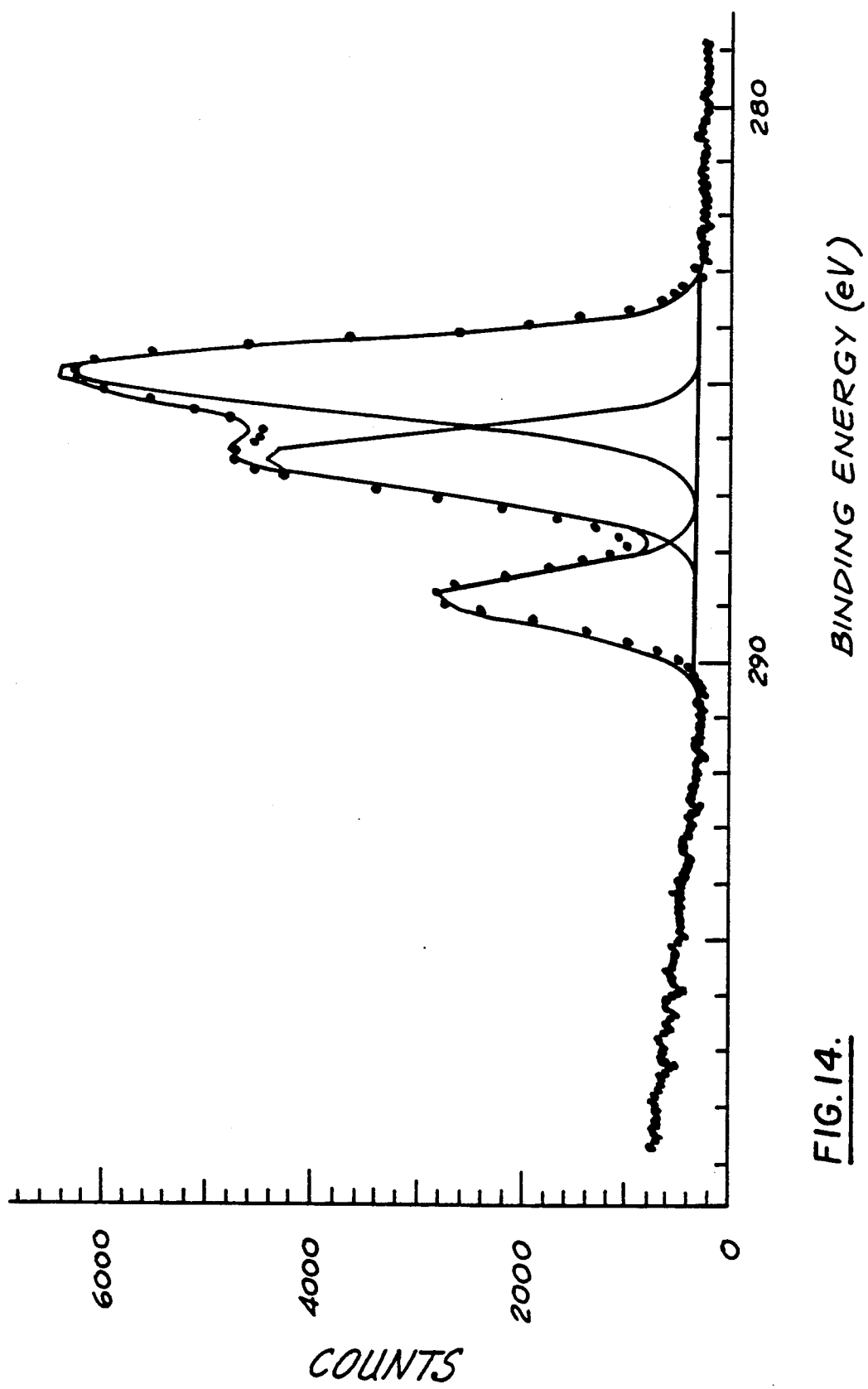
FIG. 14 shows the C1s spectrum of poly (2-hydroxyethyl methacrylate) (poly-HEMA produced by conventional chemical polymerization.
Figure 15A:
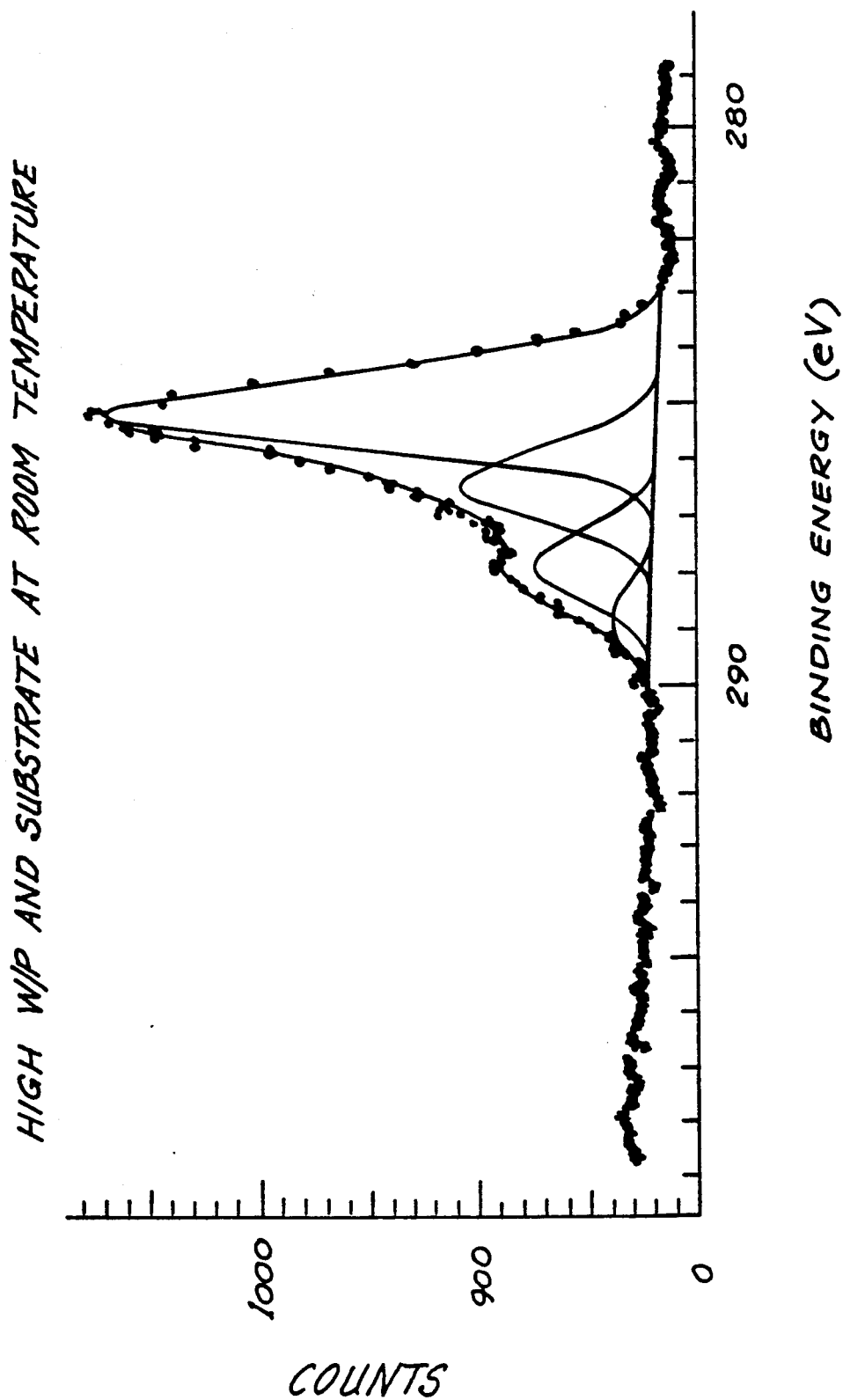
FIG. 15a), 15b), 15c) and 15d) show the resolved C1s XPS spectra for four sets of HEMA films.
Figure 15B:
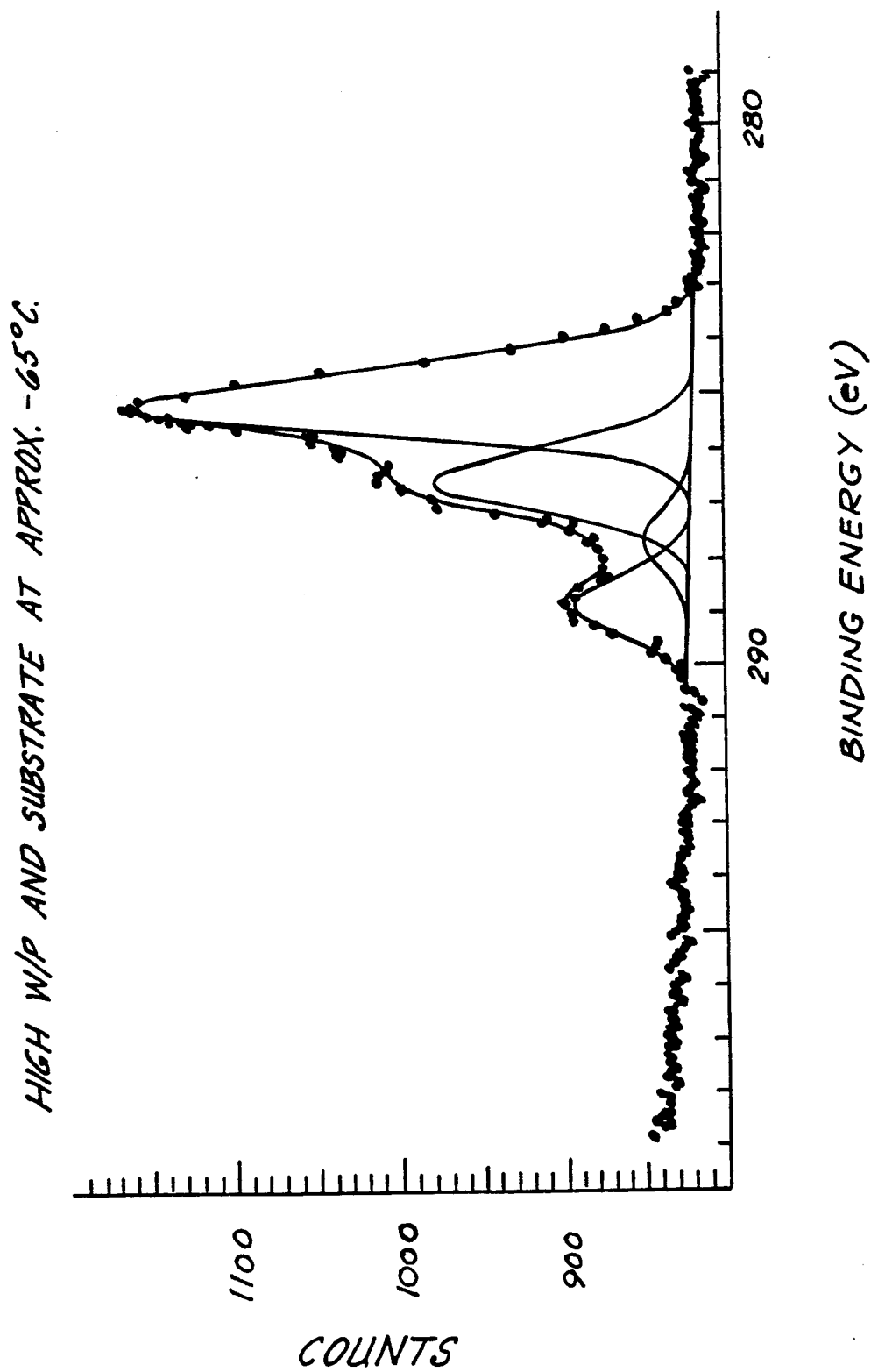
Figure 15C:
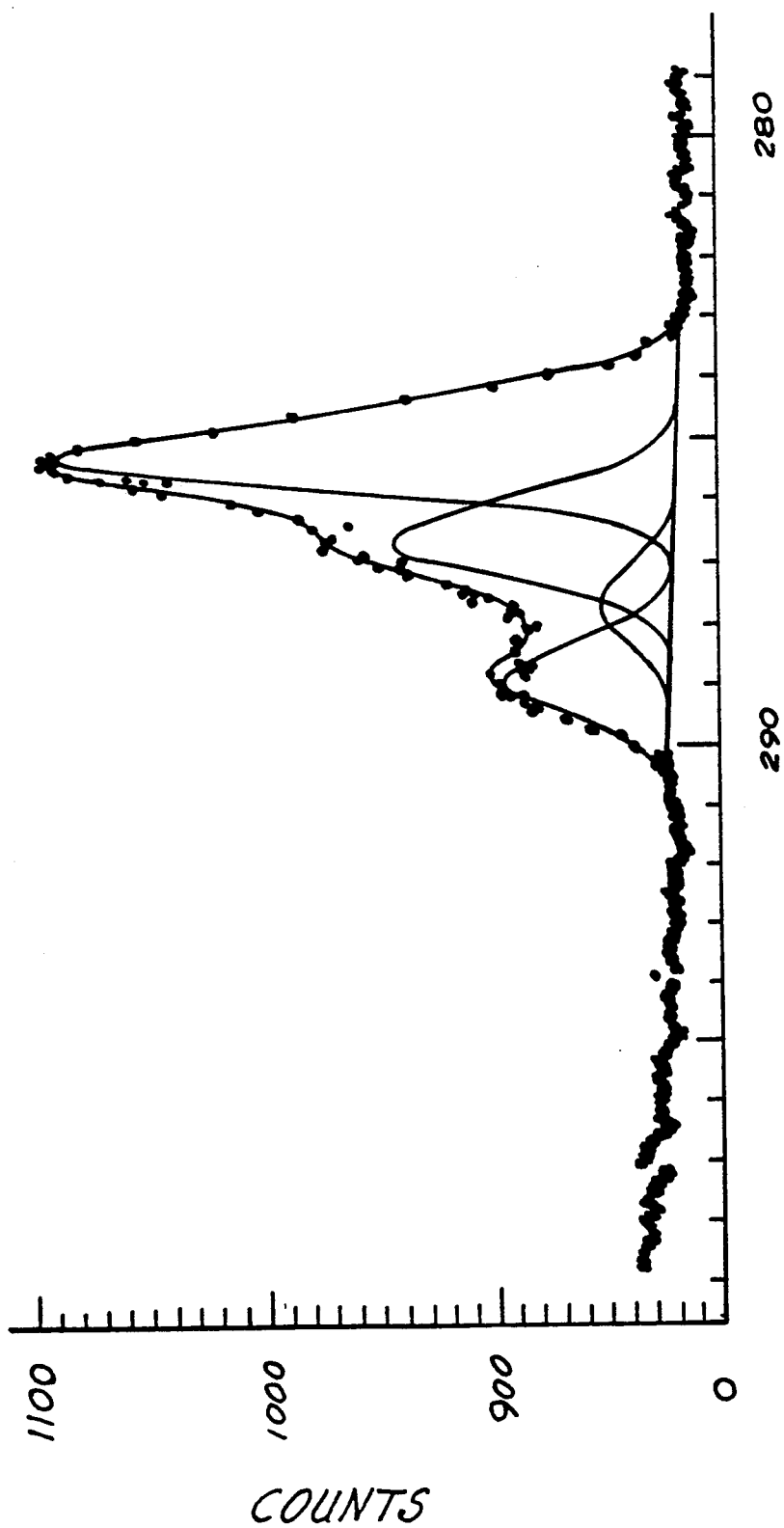
Figure 15D:
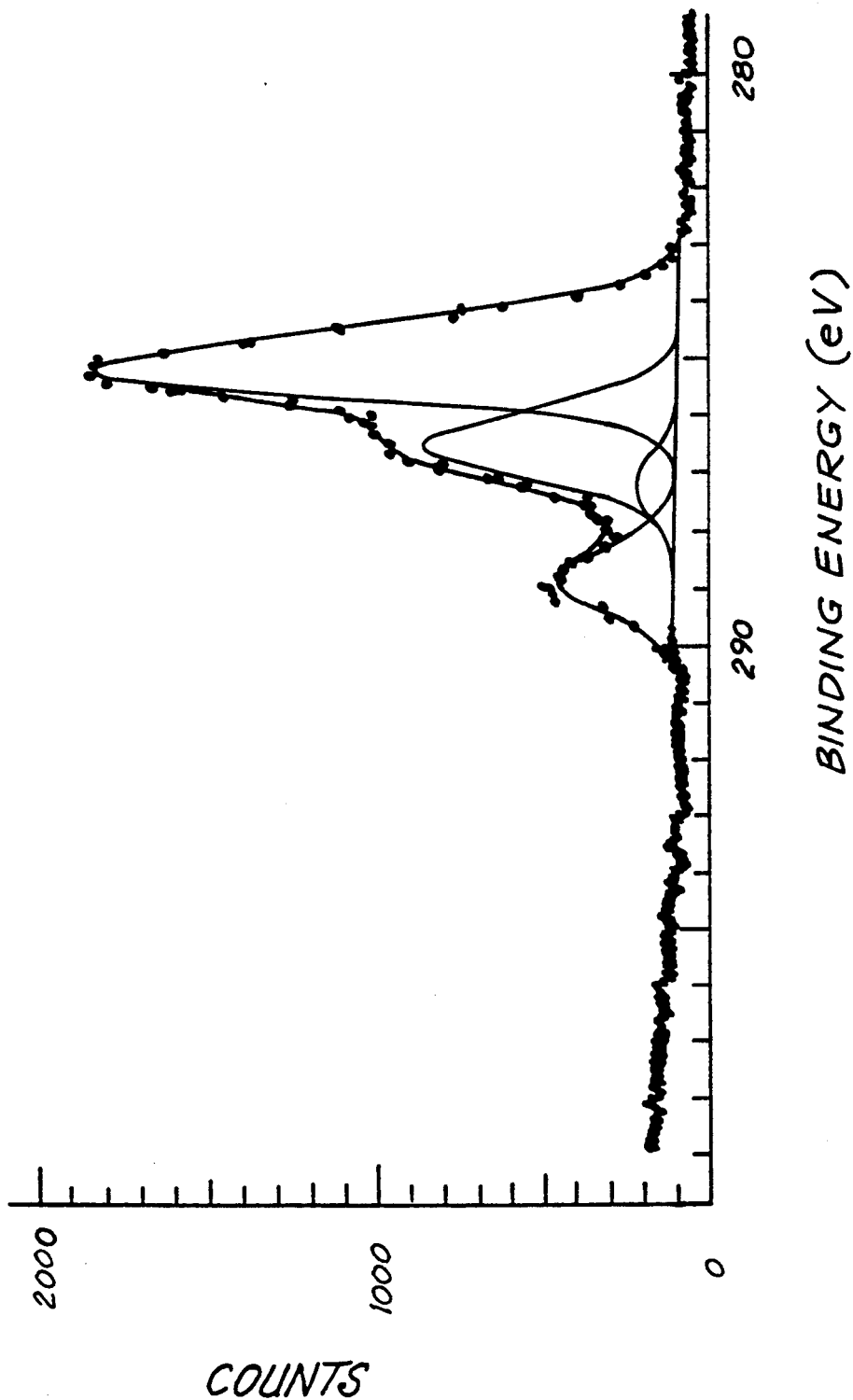

2-Hydroxyethyl methacrylate (HEMA). This precursor was chosen as a model because of its characteristic XPS spectrum, relatively high condensability and the importance of poly-HEMA as a biomaterial. FIG. 14 shows the C1s spectrum of poly-HEMA produced by a conventional chemical polymerization.

HEMA depositions were made using both the high and low power to pressure ratios. At each power to pressure ration, films were deposited on the cold stage at high and low temperatures. The resolved C1s XPS spectra for the four sets of films are given in FIG. 15. A pure poly-HEMA surface would be expected to yield a trimodal signal with peak area ratios of app oximately 3:2:1. Examination of the spectra shows that both of the samples coated on cold substrates (i.e., at both high and low power to pressure ratios) are very similar to poly-HEMA that has been prepared by traditional methods. The similarity between the spectra of these two samples is probably due to condensation and subsequent polymerization during the quench phase of the reaction. Free radicals produced by the plasma are likely to be responsible for the continued polymerization. The samples prepared on room temperature substrates showed the usual trend of more rearrangement of the precursor at high W/P and less rearrangement at low W/P. The spectra indicate that reducing the substrate temperature during deposition can be used as a method of incorporating polymerizable precursors, relatively intact, into thin films. Hence, in contrast to nonpolymerizable precursors, free radical polymerizable precursors, which can deposit by condensation and reaction during the quench phase of a reaction at low temperatures, may be less sensitive to the W/P condition of the plasma.

As mentioned previously, a good technique for corroborating and complementing the XPS data is SSIMS. Analysis of SSIMS spectra, in general, can be quite laborious, but for this system (i.e., plasma deposited HEMA) much information may be obtained from the spectra because comparisons to spectra of conventionally prepared poly-HEMA (e.g., radiation initiated), which have been studied extensively, can be made.

Positive and negative ion SSIMS spectra that were obtained from spin cast, radiation initiated poly-HEMA agree well with those published by other groups. Cursory comparison of these spectra with those of HEMA plasma deposited with and without substrate cooling indicates that the HEMA deposited at low substrate temperature is much closer in structure to the conventionally prepared poly-HEMA than the plasma deposited HEMA with no substrate cooling. These spectra are extremely rich in information on the structure of the polymer samples. However, analysis of the various peaks assignment of the ionic fragments which give rise to them, can be quite laborious. In this case, though, we are faced with a previously analyzed polymer (poly-HEMA) and so analysis of the spectra is facilitated.

Hearn and Briggs have assigned the major peaks in the poly-HEMA spectra. M. J. Hearn and D. Briggs, *Surf. Interface Anal.*, 11, 198–213 (1988). Of particular interest is the +113 D peak which has been assigned to a fragment ion which consists of the HEMA repeat unit minus the terminal hydroxyl group. Hearn and Briggs have also postulated that one fragmentation pathway of such methacrylate type polymers occurs by an unzipping of the polymer backbone. Hence, the relative intensity of the +113 D peak is an indication of the amount of HEMA precursor that has been incorporated into the plasma polymer matrix. This peak is a much more dominant part of the SSIMS spectra in the HEMA deposited at low substrate temperature than of that of the HEMA deposited with no substrate cooling. This is taken to be direct evidence of the effectiveness of reducing substrate temperature in depositing precursors which are structurally intact into a thin film matrix.

Comparison of negative ion spectra for the plasma deposited HEMA samples with spectra of conventionally prepared samples indicate films deposited from HEMA at low temperature are much more like poly-HEMA than those deposited at higher temperatures.

Ethylene Oxide. Ethylene oxide was initially deposited at high and low substrate temperatures and at high and low W/Fm on glass, Teflon, and thin and thick samples of polyethylene. Almost all XPS spectra typical of plasma deposited ethylene oxide (i.e., highly cross-linked, amorphous coatings) with some differences in the carbon to oxygen ratio (the samples coated at low temperature incorporated more oxygen, but for the most part the hydrocarbon C1s peak dominated). However, two samples (glass and Teflon) at low temperature and high flow rate strongly suggested the presence of a polyethylene oxide (PEO) type film. This was evidenced by a very dominant ether-type peak (or C—O) in the C1s peak dominated). However, two samples (glass and Teflon) at low temperature and high flow rate strongly suggested the presence of a polyethylene oxide (PEO) type film. This was evidenced by a very dominant ether-type peak (or C—O) in the C1s spectrum. Since both carbons in the PEO repeat units are singly bonded to one oxygen, only ether carbons in the PEO repeat units are singly bonded to one oxygen, only ether carbons should contribute to the C1s spectrum. Because the flow of monomer in this experiment was limited by the capacity of the flow controller, and the PEO-like films were obtained with the highest flow rate possible (10 sccm), it was concluded that the coating of PEO films by this technique was feasible if the deposition parameters are adjusted. PEO surfaces are of tremendous interest to biomaterials researchers because of their extremely low protein adsorption qualities. However, until now they have only been produced by complex chemical syntheses. These initial experiments suggested that PEO films may be produced by this new, fast, convenient, economical method.

The low temperature, high flow experiment was repeated on glass, polyethylene and polytetrafluoroethylene (PTFE) to try to deposit a film which resembles poly(ethylene oxide)(PEO). These conditions had given the best results in an earlier experiment (i.e., a PEO-like XPS spectrum) and also were the lowest W/FM and temperature used. Therefore, other deposition conditions were investigated which used a higher flow rate. For this purpose, a 0–100 sccm flow controller was procured and installed into the plasma deposition system. A newly fashioned glass cold stage was used in these depositions in which samples are directly cooled with liquid nitrogen. Almost all samples coated at this low temperature exhibited XPS spectra which indicated a less severe molecular rearrangement of ethylene oxide than is possible with conventional plasma deposition. Some of the samples produced spectra that suggest that the ethylene oxide is reacting with no further fragmentation than is necessary to open its ring structure. Results indicate that the ring opening polymerization of ethylene oxide may either result in a poly-ether structure, a poly-ketone type structure or a mixture of both. Film uniformity and inter-sample variance problems were further examined using another ring opening precursor, tetrahydrofuran, because the toxicity of ethylene oxide makes it an unfavorable candidate for routing experimentation.

Tetrahydrofuran. Preliminary experimentation with this precursor involved deposition of tetrahydrofuran (THF), with and without substrate cooling on polyethylene, polytetrafluoroethylene and glass. Deposition conditions were varied (high and low W/FM.) Evidence of retention of ether structure was observed by XPS at low substrate temperature conditions, but substrate signals were also observed (probably due to thin or nonuniform coatings.)

Further experimentation with THF addressed the problem of obtaining uniform films at low substrate temperatures on a variety of substrates. Several pretreatments prior to the deposition were conducted on glass, polyethylene, and poly(tetrafluoroethylene) substrates. XPS spectra of samples coated at low temperature with no pretreatments were compared with samples coated at low temperature with the following pretreatments:

A. Argon plasma pretreatment (40W, 4 sccm, 175 mtorr for 5 min.).

B. Deposition of THF with no substrate cooling (same conditions (W,F) as low temperature deposition for 5 min.)

C. Argon plasma treatment followed by THF deposition with no cooling.

Low temperature depositions were done using liquid nitrogen cooling of a glass cold stage. Those depositions that required THF plasma pretreatment were cooled with liquid nitrogen while the plasma was on. After deposition the films were analyzed by XPS. Elemental compositions are given in Table 3.

TABLE 3

| Substrate | Substrate elements | % C | % O | C/O | Other |
|---|---|---|---|---|---|
| No pretreatment | | | | | |
| glass | 18.86% Si, 1.56% K, 3.80% Na, 3.00% B | 23.4 | 49.42 | 0.47 | 2.46% F |
| PTFE | 51.58% F | 40.98 | 7.45 | 5.5 | — |
| PE | ? | 93.35 | 6.65 | 14.14 | — |
| Argon plasma pretreatment (A) | | | | | |
| glass | — | 74.62 | 22.30 | 3.35 | 3.08% N |
| glass 2 | — | 74.32 | 22.66 | 3.28 | 3.02% N |
| PTFE | 1.64% F | 71.08 | 24.57 | 2.89 | 2.71% N |
| PE | ? | 73.24 | 23.38 | 3.13 | 3.38% N |
| THF plasma pretreatment (B) | | | | | |
| glass | 7.69% Si, 1.18% Na | 53.14 | 37.99 | 1.40 | — |
| PTFE | — | 79.62 | 20.38 | 3.86 | — |
| PE | ? | 82.12 | 17.88 | 4.59 | — |
| Argon and THF plasma pretreatments (C) | | | | | |
| Glass 1 | — | 80.81 | 19.19 | 4.21 | — |
| Glass 2 | — | 79.55 | 20.45 | 3.89 | — |
| PTFE | — | 80.72 | 19.28 | 4.18 | — |
| PE | ? | 81.44 | 18.56 | 4.39 | — |

The different pretreatments produced a variety of final film depositions. The depositions with no pretreatment again showed evidence of substrate in the XPS analysis. This may have been due to either deposition of very thin films or patchy, nonuniform films. The presence of substrate signal in the XPS spectrum of the sample with a polyethylene (PE) substrate is questionable because carbon, which is the sole detectable element in the substrate, is also present in the deposited film. Because of the presence of substrate signals in the XPS spectra, the relative amounts of carbon and oxygen detected vary enormously from sample to sample (with the exception of the oxygen signal on PE and poly(tetrafluoroethylene) (PTFE) which should have oxygen). Thus, more surface sensitive, analytical techniques (such as angular dependent XPS or SSIMS) may be necessary for the comparison of ultrathin films on different substrates. In addition, deposition of thicker coatings at these conditions may be difficult because condensation of precursor is so rapid at these low temperatures that polymerization occurring after a thick nonreacted layer is deposited may not remain on the substrate after heating back to ambient temperature. Hence, more complex, precise temperature control (not just longer deposition times) may be necessary to obtain thicker films of some precursors. Furthermore, more precise temperature control (at or near the condensation temperature) may allow control of chemistry together with uniformity.

The argon plasma pretreated sample a greater uniformity than the samples deposited with no pretreatment. Both glass samples analyzed exhibited no substrate signals. The PTFE sample spectra did exhibit a small amount of fluorine, but did not exhibit a contribution from —$CF_2$ groups in the Cls envelope. The absence of any significant PTFE carbon peak indicates that a complete overlayer of plasma deposited was formed instead of a patchy film.

Further evidence of uniform films is the relative constancy of the elemental composition of films coated on the various substrates. All sample, however, contained a small percentage of nitrogen. The source of this nitrogen is not clear since the samples were supposedly only exposed to argon and THF plasmas. The incorporation of nitrogen into the deposited THF film matrix due to leaks in the vacuum chamber is not likely because the base pressure of the reactor prior to deposition was the same as in other runs. Furthermore, the THF plasmas in all depositions looked very much the same color. The argon plasma is a likely candidate as a source of nitrogen incorporation because nitrogen is frequently dosed into the reactor through the same inlet line and flow controller as the argon. An alternative hypothesis is that the argon coming into the reactor is clean, but the argon plasma creates a very reactive surface with which nitrogen, still present after the base pressure (approx. 10 mtorr) is attained, can incorporate.

The presence of small amounts of fluorine in the PTFE substrate sample may indicate that the film thickness was on the order of the sampling depth of the XPS. Hence, an intermediate, nitrogen containing layer produced subsequent (or during) the argon treatment may have been detected. The reason nitrogen was not seen in the other deposition which used an argon pretreatment may be that in that deposition the samples were further pretreated with a THF plasma prior to the final deposition of THF at low temperature. The use of argon plasmas to clean surfaces in vacuum systems is widespread and the cleaning of substrate samples by bombardment of energetic argon ions may lead to a more uniform interface (and coating) during deposition. The creation of a highly reactive surface by the argon pretreatment may be another reason that more uniform coating are observed when using this pretreatment.

Glass samples pretreated with a THF plasma with no substrate cooling prior to deposition at low temperature exhibited substrate element signals upon XPS analysis. The PTFE samples did not, however, but a great amount of inter-sample variance in elemental composition was observed. These results indicate that at the conditions and reaction times used, a THF plasma pretreatment, alone, is not very effective in producing uniform films on these various substrates. Perhaps if a longer pretreatment time were allowed, more agreement would be seen in film compositions.

The samples pretreated with an argon plasma and a THF plasma prior to THF deposition at low substrate temperature were seen to have the most uniform elemental composition. This is evidenced by both the absence of substrate signals in the XPS spectra and the small variance in inter-sample comparison of compositions. In addition, all samples with these pretreatments followed by a low temperature THF deposition exhibit carbon to oxygen ratios virtually identical (within XPS experimental error) to that of the precursor, THF. This indicates that the precursor is being deposited into the film without a large amount of precursor fragmentation.

In conclusion, this example shows that various pretreatments may be used to enhance the uniformity of films produced with chemical control by reducing substrate temperatures, even when precise temperature control is not available. If it is possible to control the relative amounts of nonactivated and plasma activated species in the vicinity of film growth with a more precise control of temperature, it may be possible to enhance uniformity without any pretreatment. This may be desirable if the substrate and deposited film are intended to serve specific chemical functions without any barrier between them (e.g., selective membrane applications).

While the invention has been described in conjunction with preferred embodiments, one of ordinary skill after reading the foregoing specification will be able to effect various changes, substitutions of equivalents, and alterations to the subject matter set forth herein. Hence, the invention can be practiced in ways other than those specifically described herein. It is therefore intended that the protection granted by Letters Patent hereon be limited only by the appended claims and equivalents thereof.

The embodiments of the invention in which an exclusive property or privilege is claimed are defined as follows:

1. A thin film of controlled chemical structure produced by depositing poly(ethylene) glycol oligomers or esters of methacrylic acid by plasma deposition on a substrate in a deposition chamber while maintaining a negative temperature differential between said substrate and said deposition chamber sufficient to cause said poly(ethylene) glycol oligomers or said esters of methacrylic acid to preferentially condense or adsorb on said substrate relative to said deposition chamber, and to form said film on said substrate, wherein said poly(ethylene) glycol oligomers are selected from the group consisting of di-, tri-, tetra-, penta-, and hexa-(ethylene) glycol dimethyl ether, and mixtures thereof, and said ester of methacrylic acid is selected from the group consisting of 2-hydroxyethyl, 2-hydroxypropyl, lauryl, and octadecyl methacrylate, and mixtures thereof.

2. A substrate coated by a thin film according to claim 1.

3. A substrate coated by a thin film according to claim 2, wherein said substrate is stainless steel, glass, polyethylene, polytetrafluoroethylene, brass, or polyethylene terephthalate.

4. A method of controlling the chemical structure of a 2-hydroxyethyl methacrylate film deposited on a substrate comprising depositing 2-hydroxyethyl methacrylate by plasma deposition on said substrate in a deposition chamber while maintaining a negative temperature differential between said substrate and said deposition chamber sufficient to cause said 2-hydroxyethyl methacrylate to preferentially condense or adsorb on said substrate relative to said deposition chamber, and to form said film on said substrate.

* * * * *

UNITED STATES PATENT AND TRADEMARK OFFICE
CERTIFICATE OF CORRECTION

PATENT NO. : 5,153,072  Page 1 of 4
DATED : October 6, 1992
INVENTOR(S) : B. Ratner et al It is certified that error appears in the above-indentified patent and that said Letters Patent is hereby corrected as shown below:

On the title page, Item [56]: Other Publication "Nagoaka et al" should read --Nagaoka et al--. "Arif." should read --Artif.--. "Biocompatability" should read --Biocompatibility--. "Poly(ethye-lene" should read --Poly(ethylene--. "Poly(ethyelen" should read --Poly(ethylene--.

| COLUMN | LINE | |
|---|---|---|
| 1 | 37 | "illdefined" should read --ill-defined-- |
| 1 | 47 | "199-14 293" should read --199-293-- |
| 1 | 54&55 | "fuc-tionalities" should read --functionalities-- |
| 2 | 24 | "low" should read --lower-- |
| 3 | 49 | "Plasm" should read --Plasma-- |
| 3 | 62 | "2.1" should read --2.0-- |
| 4 | 6 | "A. Kilks" should read --A. Dilks-- |
| 4 | 19 | "mechanism" should read --mechanisms-- |
| 4 | 47 | "present" should read --presents-- |
| 4 | 59 | "subjecting" should read --subject-- |
| 5 | 46 | after "290.7 eV" begin a new paragraph with "FIGS. 7a" |
| 7 | 41 | "SPS" should read --XPS-- |
| 7 | 43 | "SPS" should read --XPS-- |
| 7 | 48 | after "carbon-containing" delete "functional groups of the film to the total area under several or all XPS peaks, as compared to the analogous ratio for the precursor can give an indication of the degree of precursor fragmentation. If a specific carbon-containing" |

UNITED STATES PATENT AND TRADEMARK OFFICE
CERTIFICATE OF CORRECTION

PATENT NO. : 5,153,072

DATED : October 6, 1992

INVENTOR(S) : B. Ratner et al.

It is certified that error appears in the above-indentified patent and that said Letters Patent is hereby corrected as shown below:

| COLUMN | LINE | |
|---|---|---|
| 7 | 54 | "Cf$_3$" should read --CF$_3$-- |
| 7 | 55 | "fuctionality" should read --functionality-- |
| 7 | 56 | "fuctionalities" should read --functionalities-- |
| 8 | 50 | "sued" should read --used-- |
| 8 & 9 | 68 through l. 2 (next column) | after "substrate" delete "and chamber walls and, electrodes, inlet and outlet lines, etc.) is important to all embodiments of the process. The temperatures of the substrate" |
| 9 | 50 | after "embodiment)," delete "and" and insert --an-- |
| 11 | 64 | "K+" should read --K$^+$-- |
| 12 | 33 | "application" should read -applications-- |
| 12 | 63 | "material" should read --materials-- |
| 12 | 64 | after "ionizing" insert --radiation-- |
| 13 | 55 | "glow" should read --flow-- |
| 14 | 6 | "measurement" should read --measurements-- |
| 14 | 52 | "reacting" should read --reactions-- |
| 15 | 33 | "A. Kilks" should read --A. Dilks-- |
| 15 | 47 | after "those at" insert --288.0 eV represent carbons with two bonds to oxygen and those at-- |
| 16 | 35 | "SPS" should read --XPS-- |
| 16 | 46 | "(W/P" should read --(W/P)-- |
| 17 | 12 | "(22)" should read --(22%)-- |
| 17 | 28 | "SPS" should read --XPS-- |
| 17 | 31-33 | after "decreased" delete "composition as the temperature decreased. The carbon to oxygen ratio decreased" |

UNITED STATES PATENT AND TRADEMARK OFFICE
CERTIFICATE OF CORRECTION

PATENT NO. : 5,153,072                    Page 3 of 4
DATED : October 6, 1992
INVENTOR(S) : B. Ratner et al.

It is certified that error appears in the above-indentified patent and that said Letters Patent is hereby corrected as shown below:

| COLUMN | LINE | |
|---|---|---|
| 18 | 7 | after "of" delete "a" and insert --the-- |
| 18 | 28 | after "analysis" insert --was performed on samples of plasma deposited acetone which had been deposited at high, intermediate and low substrate temperatures. XPS analysis-- |
| 20 | 13 | "for" should read --four-- |
| 20 | 23 | "material" should read --materials-- |
| 20 | 35 | "EXCA" should read --ESCA-- |
| 21 | 10 | "measurement" should read --measurements-- |
| 22 | 20 | after "means of" insert --incorporating fragile chemical functionalities that would normally be destroyed in-- |
| 22 | 33&34 | "(BE's )" should read --(BE's)-- |
| 22 | 36 | "CHn)" should read --(CHn)-- |
| 22 | 63 | "scientific" should read --Scientific-- |
| 22 | 68 | "$<10^{13}$ ions cm$^{13}$ ions cm $^{-2}$" should read --$<10^{13}$ ions cm$^{-2}$-- |
| 23 | 1 | "VG-12" should read --VG 12-12-- |
| 23 | 12 | "ration" should read --ratio-- |
| 24 | 17 | "W/Fm" should read --W/FM-- |
| 24 | 18 | after "spectra" insert --of these films deposited at both high and low temperatures showed spectra-- |

UNITED STATES PATENT AND TRADEMARK OFFICE
CERTIFICATE OF CORRECTION

PATENT NO. : 5,153,072  
DATED : October 6, 1992  
INVENTOR(S) : B. Ratner et al Page 4 of 4

It is certified that error appears in the above-indentified patent and that said Letters Patent is hereby corrected as shown below:

| COLUMN | LINE | |
|---|---|---|
| 24 | 28-32 | after "C1s" delete "peak dominated). However, two samples (glass and Teflon) at low temperature and high flow rate strongly suggested the presence of a polyethylene oxide (PEO) type film. This was evidenced by a very dominant ether-type peak (or C-O) in the C1s" |
| 24 | 34-36 | after "carbons" delete "in the PEO repeat units are singly bonded to one oxygen, only ether carbons" |
| 25 | 6 | "routing" should read --routine-- |
| 26 | 67 | "coating" should read --coatings-- |

Signed and Sealed this

Nineteenth Day of April, 1994

Attest:

BRUCE LEHMAN

Attesting Officer  Commissioner of Patents and Trademarks